April 17, 1962

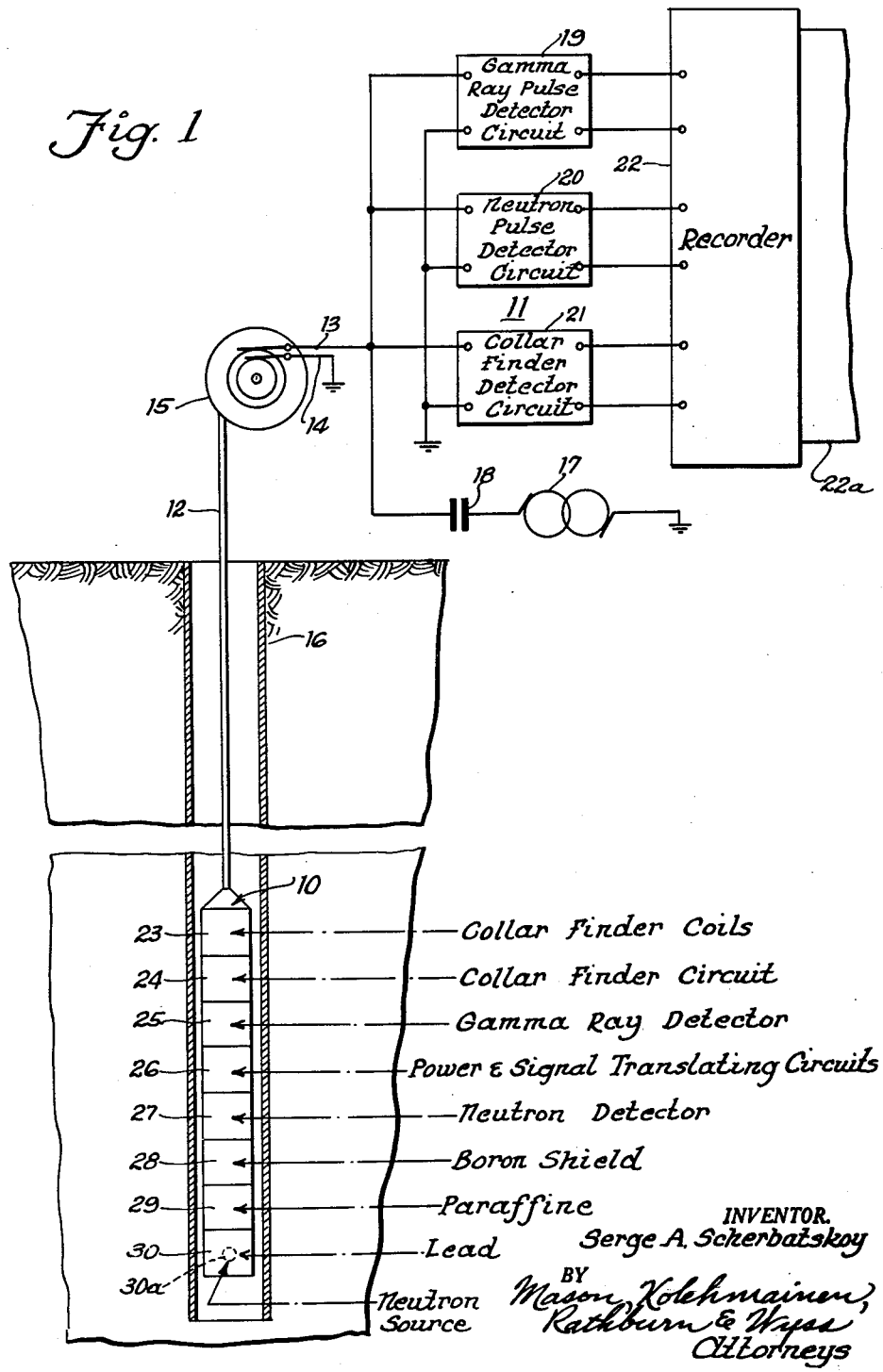

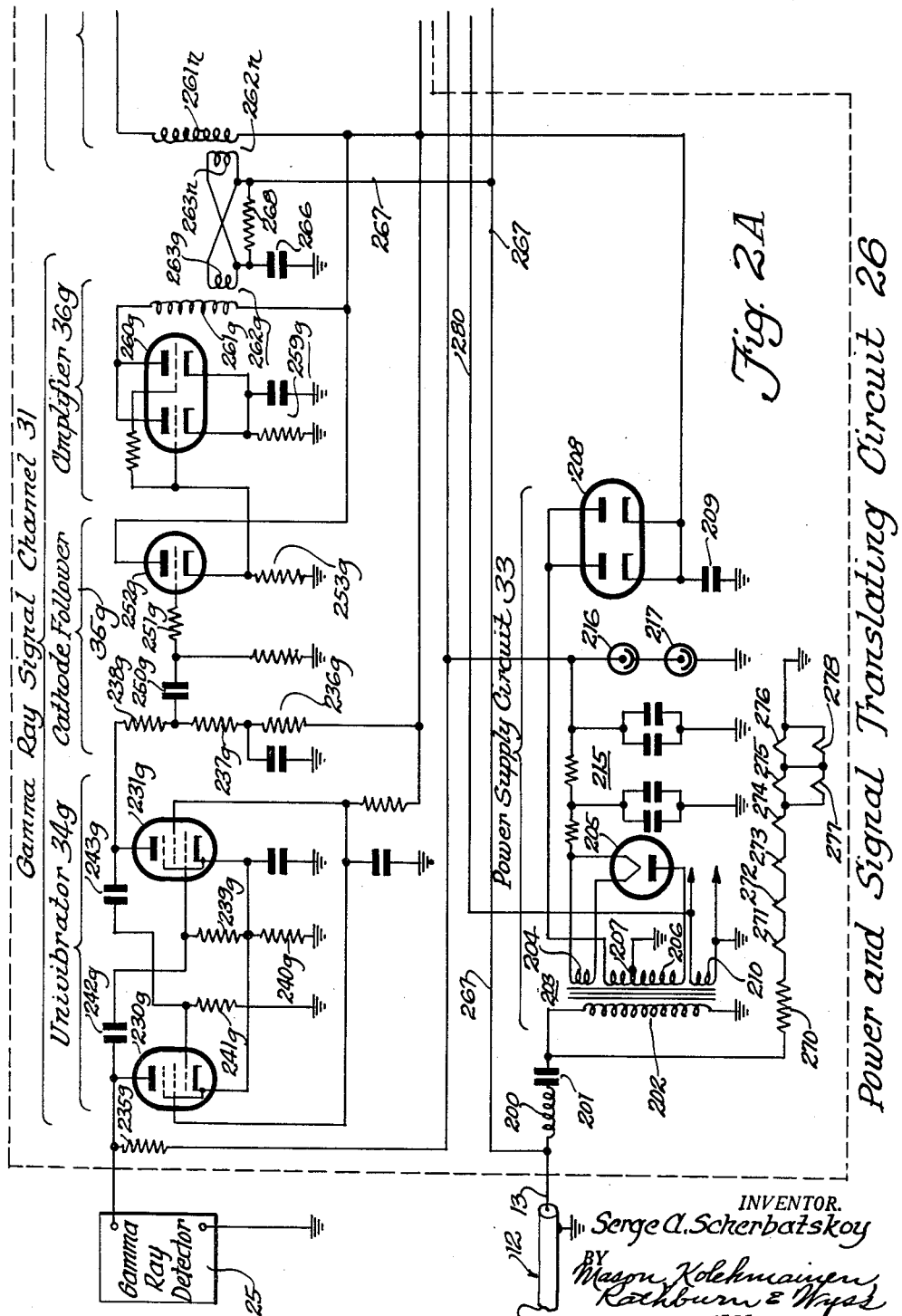

S. A. SCHERBATSKOY 3,030,511

RADIATION WELL LOGGING SYSTEM

Filed March 14, 1956

INVENTOR.
Serge A. Scherbatskoy
BY
Mason, Kolehmainen,
Rathburn & Wyss
Attorneys April 17, 1962  S. A. SCHERBATSKOY  3,030,511
RADIATION WELL LOGGING SYSTEM
Filed March 14, 1956  11 Sheets-Sheet 4
*Integrating Circuit 43g*
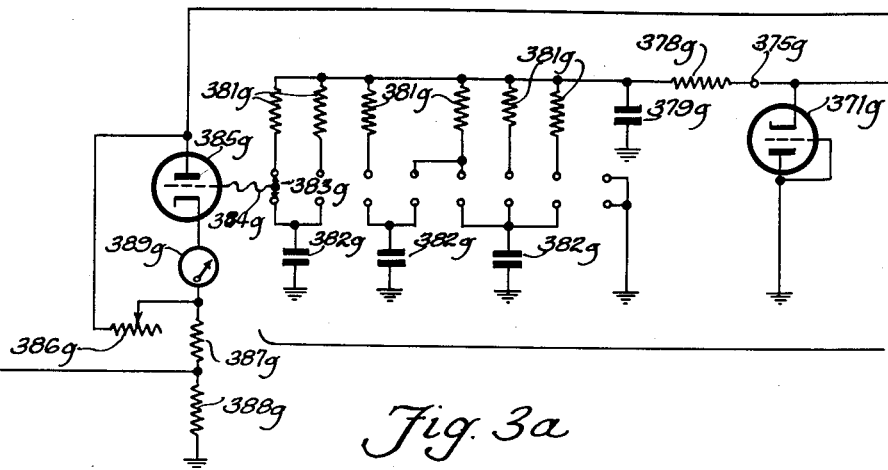
*Fig. 3a*
*Integrating Circuit 43n*
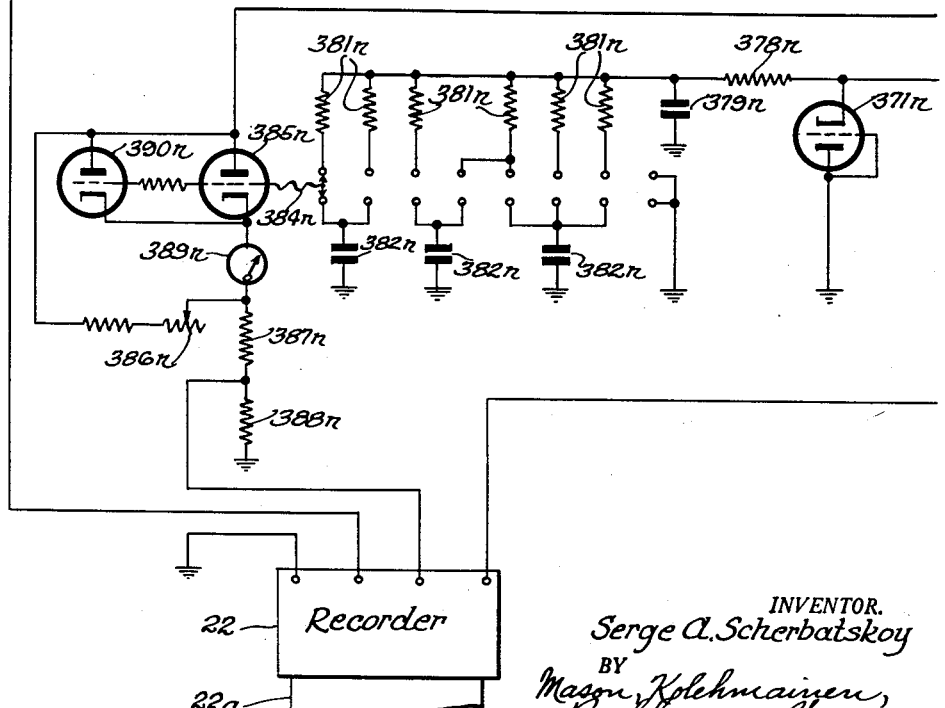
INVENTOR.
Serge A. Scherbatskoy
BY
Mason, Kolehmainen,
Rathburn & Wyss
Attorneys

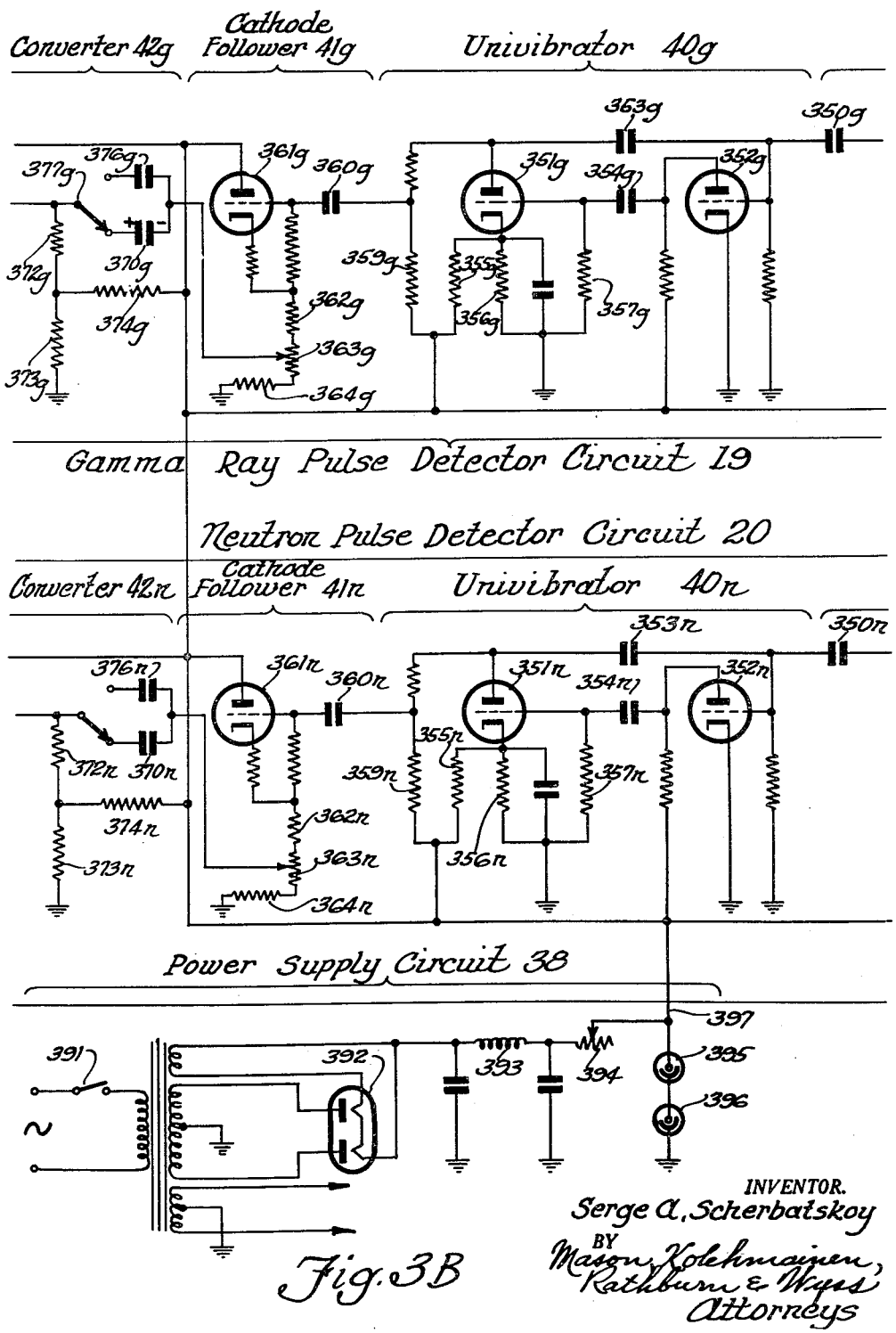

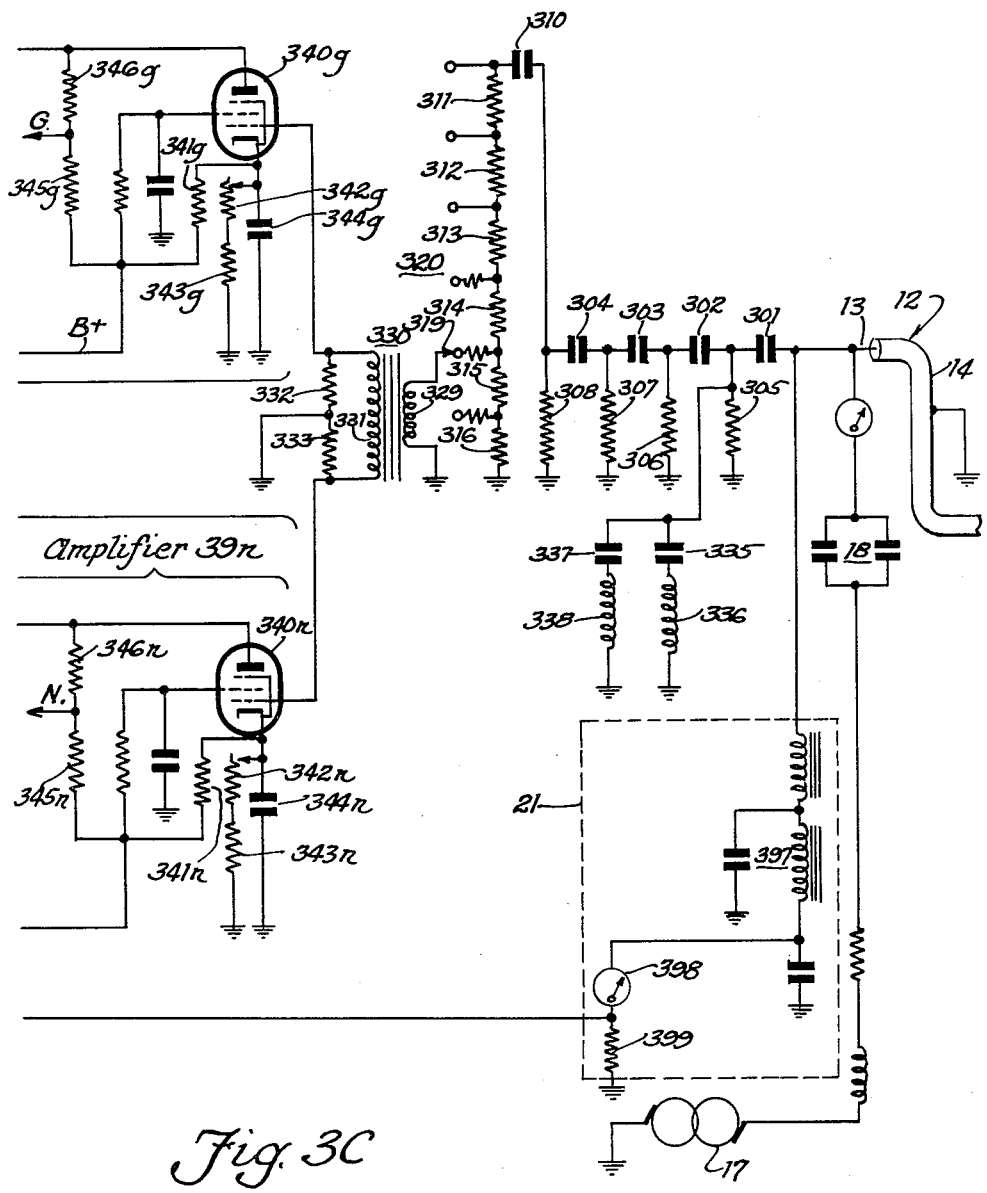

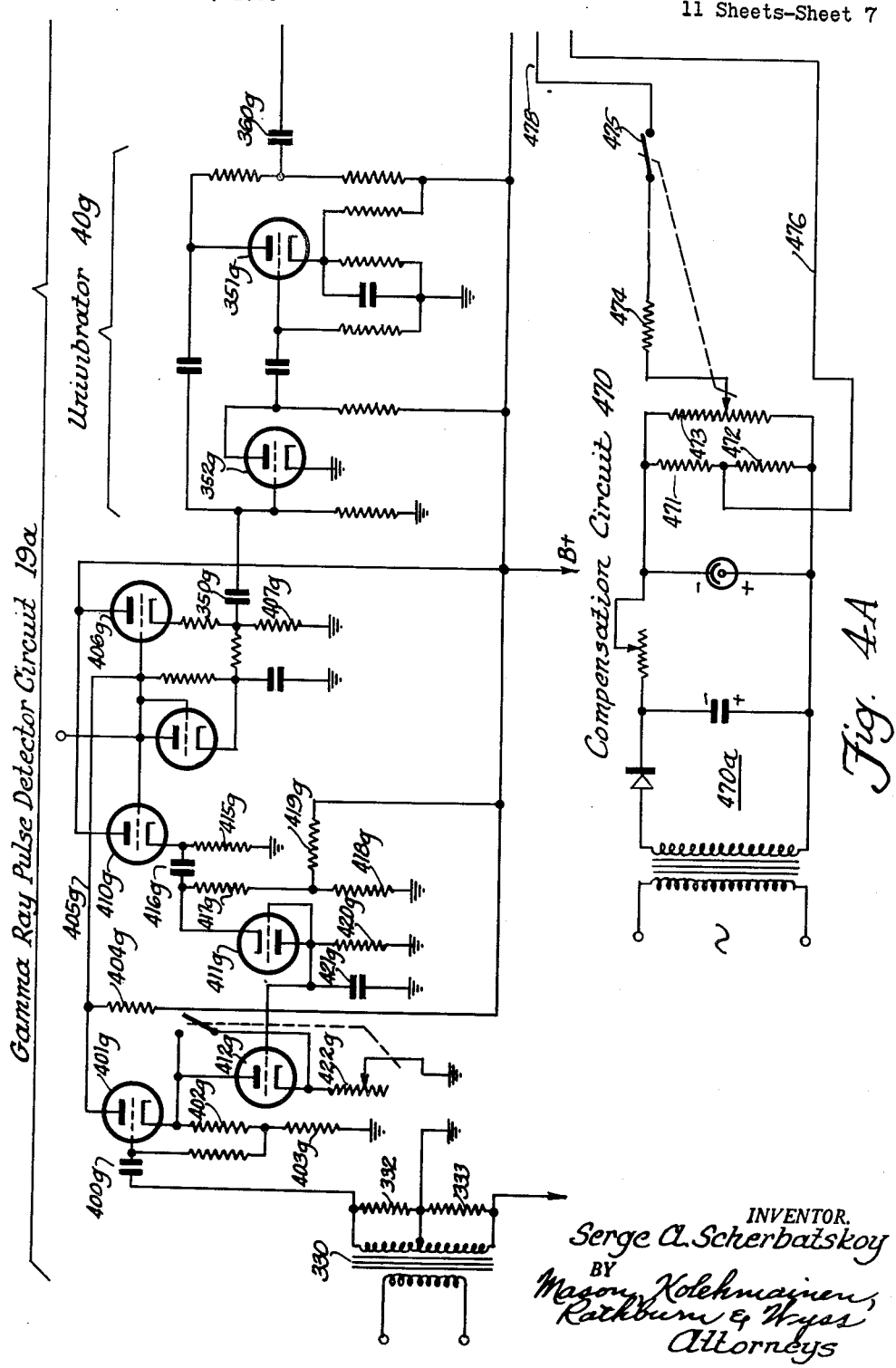

April 17, 1962

S. A. SCHERBATSKOY 3,030,511

RADIATION WELL LOGGING SYSTEM

Filed March 14, 1956

INVENTOR.
Serge A. Scherbatskoy
BY
Mason, Kolehmainen,
Rathburn & Wyss
Attorney

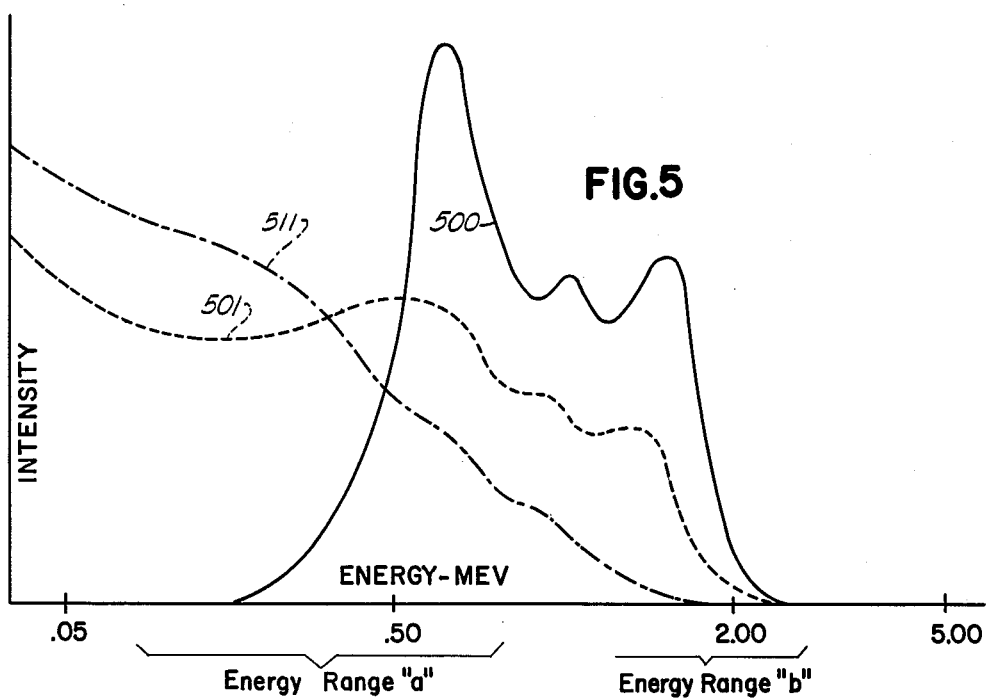
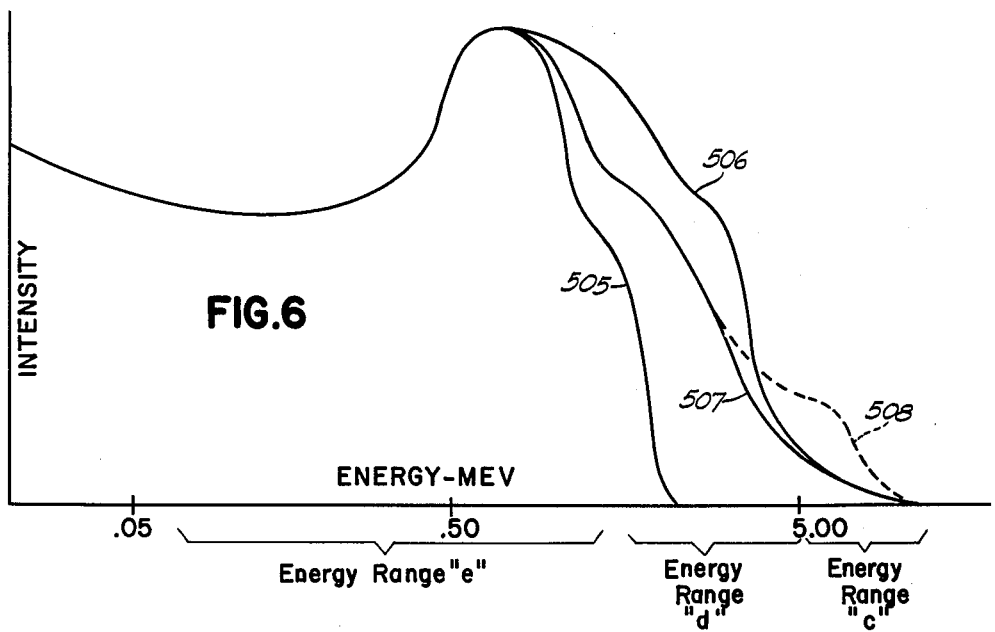

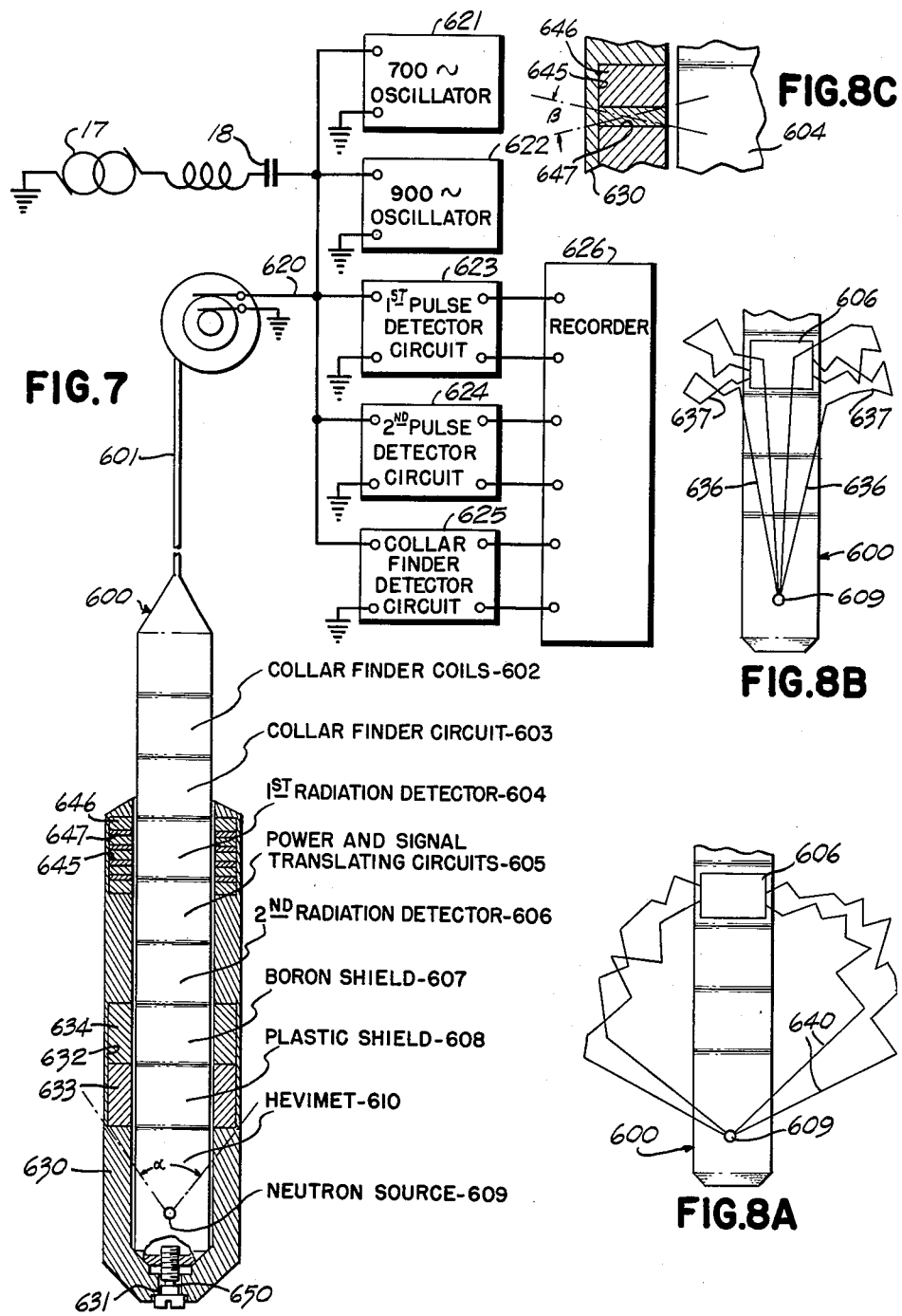

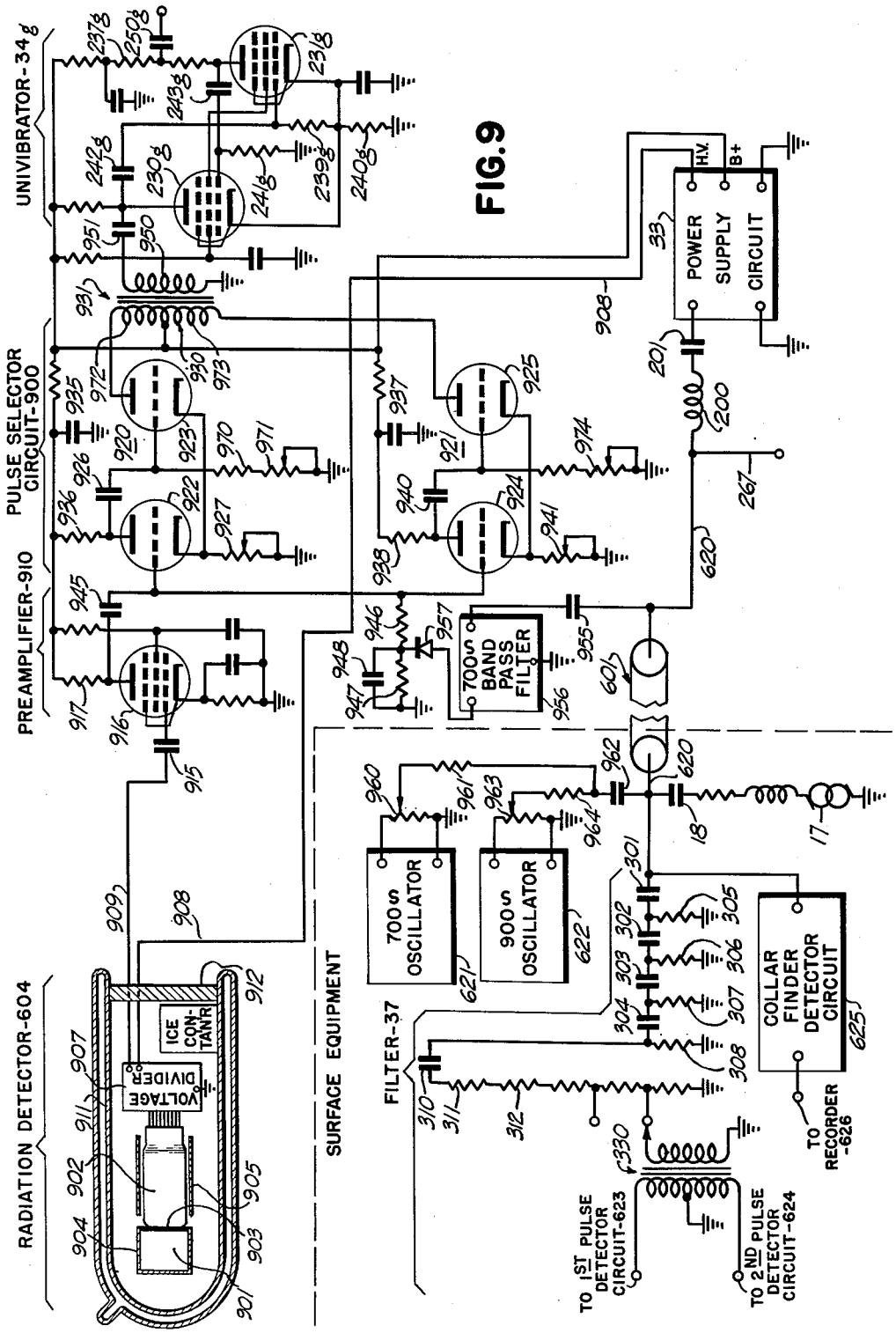

United States Patent Office 3,030,511
Patented Apr. 17, 1962

3,030,511
RADIATION WELL LOGGING SYSTEM
Serge A. Scherbatskoy, Tulsa, Okla., assignor, by mesne assignments, to PGAC Development Company, Houston, Tex., a corporation of Texas
Filed Mar. 14, 1956, Ser. No. 571,544
14 Claims. (Cl. 250—83.3)

The present invention relates to radiation well logging and, more particularly, to a radiation well logging system for simultaneously obtaining two different radiation logs together with a correlated collar log. Specifically, the present application is a continuation-in-part of my copending application Serial No. 205,616, which was filed on January 12, 1951 and issued as U.S. Letters Patent No. 2,740,053 on March 27, 1956.

In the art of radiation well logging, two types of logging systems are in general use. When using systems of the first type, a gamma ray log is obtained wherein the intensity of gamma rays emitted naturally from subsurface formations is logged. In using systems of the second type, an artificial radiation source and a detector are lowered into the borehole and the relative intensity of neutrons in the surrounding subsurface formations or the intensity of gamma rays of capture is logged. In general, the natural gamma ray logging system permits identification of formation, or stratigraphy, which is impossible to obtain with logging system employing a suitable radiation source, such as a source of neutrons. Typical formations such as highly radioactive shales or low radioactivity limestones and sandstones afford excellent markers for natural gamma ray log correlations. However, information regarding fluid or gas within the formation, the fluid level within the borehole and the porosity of the subsurface formation is not indicated in the natural gamma ray log, but may be obtained by a radiation log of the formation when it is bombarded by a source of neutrons. On the other hand, analysis of the information given by this neutron source log alone sometimes leads to erroneous results because no distinction can be made between porous zones in sand or limestone and shale formations which contain a high percentage of water. It is, therefore, necessary to combine the natural gamma ray log with the neutron source log in order that both stratigraphy and possible pay zones may be accurately located.

In such situations it is extremely desirable to produce both logs simultaneously so that correlated information is obtained in a single operation. However, if natural gamma rays are to be measured in the same subsurface unit as radiations due to the neutron source, the problem arises of preventing the natural gamma ray detector from falsely responding to neutrons and gamma rays emanating from the neutron source to the subsurface unit. While certain neutron sources are available which emit very few gamma rays, such as, for example, radium D-berylluim or polonium-beryllium, these sources either have too short a half life or are too expensive to be commercially acceptable. On the other hand, a low cost neutron source having a long half life, such as radium-beryllium, is a very powerful gamma ray emitter, and it would be expected that at least a one hundred foot spacing between the neutron source and the natural gamma ray detector would be required in order to prevent the neutron source from unduly affecting the output of the natural gamma ray detector.

With both the natural gamma ray log and the neutron source log, it is necessary to obtain accurate depth measurements both for the purpose of correlating the two logs and for the purpose of checking previous depth measurements. Of the conventional depth measuring methods, the casing collar logging method is generally considered the most accurate; such devices as the depth measuring sheave, etc., being inaccurate due to stretching of the supporting cable as the apparatus is lowered into the hole. It would be desirable, therefore, to provide facilities for simultaneously obtaining the above described logs together with a collar position log and to employ an armored cable to raise and lower the apparatus, to supply power to the subsurface equipment and to transmit all of the logging information from the subsurface equipment to the surface equipment.

In making a natural gamma ray log, it is customary to measure substantially the entire energy spectrum of the gamma rays naturally emanating from the formations. However, such logs respond strongly to the relatively low energy gamma rays which come from a region relatively close to the subsurface unit, and these low energy gamma rays are materially affected by the drilling mud, the casing, and the mud cake within the borehole itself which are relatively constant factors so that the percentage intensity change of these low energy gamma rays due to changes in the rock formations is relatively reduced. It would, therefore, be desirable to exclude the low energy natural gamma rays in taking a natural gamma ray log and to measure only the more penetrating rays which effectively represent regions a greater distance behind the wall of the borehole and are less affected by the drilling mud, casing, etc.

When gamma rays of capture are measured in conjunction with a radium-beryllium source in the subsurface unit, a large portion of the energy spectrum of the measured gamma rays is due to gamma rays emitted by the radium of the radium-beryllium source and a further portion of the energy spectrum of the measured gamma rays varies with the salt content of the drilling mud or of the connate water in porous formations. It would be desirable to provide such a neutron source log which responds primarily to porosity variations of the formations and is substantially unaffected by gamma rays due to the radium of the radium-beryllium source or gamma rays of capture produced in accordance with the salt content of the drilling mud and the connate water. While it has been found that the log is improved by increasing the spacing between the radium-beryllium source and the detector, when the source-detector spacing is increased, the intensity of the gamma rays of capture decreases very rapidly, first because of the inherent square law decrease and secondly because of absorption in the formations. Accordingly, as the source-spacing is increased, the intensity of the gamma rays of capture rapidly decreases to the point where it is overridden by gamma rays naturally emanating from the formations. Increasing the efficiency of the detector does not remedy this situation since a more efficient detector would merely detect both the gamma rays of capture and the natural gamma rays with increased efficiency and would not affect the relative intensities thereof. It would, therefore, be desirable to eliminate certain portions of the spectrum of the measured gamma rays in the case of a neutron-gamma ray of capture log so that this log would not include gamma rays due to the radium of the radium-beryllium source or due to salt in the environing fluids or gamma rays naturally emanating from the formation so that a large source-detector spacing may be employed.

In the case of a neutron source log, i.e., either a neutron-neutron or a neutron-gamma ray of capture log, it has been found that some of the neutrons from the source travel almost vertically upwardly from the source through the inside of the subsurface unit or in the material immediately surrounding the unit such as the steel housing, the steel well casing, and the drilling mud, and then in the immediate vicinity of the detector these neutrons migrate outwardly into the formation and then back to the detector. These vertically travelling neutrons substantially nullify the advantages of a long source-detecting spacing. Neutrons from the source may be prevented from travelling vertically through the inside of the subsurface unit by employing suitable shields. In addition, the subsurface unit must necessarily be of relatively small diameter to be inserted into small diameter boreholes and when such a subsurface unit is employed in logging boreholes of relatively large diameter, an annulus of drilling mud of substantial thickness is provided in which the neutrons can migrate upwardly and produce a substantially constant response in the detector which masks the true variations in detector response due to changes in the formation. Also, when a relatively small diameter subsurface unit is employed in a large diameter borehole, changes in detector response are experienced due to variation of the spacing of the casing with respect to the borehole wall and the spacing of the subsurface unit with respect to the casing.

Accordingly, it is an object of the present invention to provide a new and improved radiation logging system for simultaneously producing a natural gamma ray log and a neutron source log of a borehole.

It is a further object of the present invention to provide new and improved radiation logging apparatus for simultaneously producing energy selective natural gamma ray and energy selective neutron source logs.

It is a still further object of the present invention to provide new and improved radiation logging apparatus for simultaneously producing energy selective natural gamma ray and energy selective neutron source logs together with a correlated collar position log, in which a single cable, preferably comprising a single insulated conductor, is used to lower the apparatus into the borehole, to convey all of the logging information to the surface equipment and also to supply electrical power to the subsurface apparatus.

Another object of the present invention resides in the provision of a new and improved well logging system wherein an energy selective log of natural gamma rays within a predetermined energy range is obtained.

Still another object of the present invention resides in the provision of a new and improved well logging system wherein a neutron source is employed to bombard the formations and an energy selective log of gamma rays of capture within a predetermined energy range is obtained.

It is another object of the present invention to provide a new and improved well logging system wherein a natural gamma ray log and a log resulting from neutron bombardment are simultaneously obtained and wherein the natural gamma ray detector may be spaced relatively close to the neutron source without adverse effect on the natural gamma ray log.

It is still another object of the present invention to provide a new and improved well logging system wherein pulses representative of incoming radiations within a predetermined energy range may be accurately separated from pulses outside said energy range.

It is a further object of the present invention to provide a new and improved well logging system wherein means are provided within the subsurface unit of the system for accurately separating pulses representative of incoming radiations within a predetermined energy range from pulses representative of incoming radiations outside said energy range and wherein means are provided at the earth's surface for varying said energy range.

It is a still further object of the present invention to provide a new and improved well logging system wherein a source of neutrons is employed, an energy selective log of gamma rays of capture within a predetermined energy range is obtained, an energy selective log of natural gamma rays within a predetermined energy range is obtained, means are provided in the subsurface unit for varying said energy ranges, a single conductor cable is used to lower said subsurface unit into the borehole and to convey all of the logging information to the earth's surface, and means are provided at the earth's surface for controlling said energy range varying means over said single conductor cable.

It is another object of the present invention to provide a new and improved well logging system wherein a neutron source is employed and a log resulting from neutron bombardment is obtained, and facilities are provided for logging in boreholes of relatively large diameter while preventing neutrons from said source from travelling substantially upwardly through the borehole.

It is still another object of the present invention to provide a new and improved well logging system employing an elongated tubular subsurface unit wherein a sleeve is secured to said tubular subsurface unit in logging boreholes of relatively large diameter and means are provided for detaching said unit from said sleeve if the latter becomes stuck in the borehole.

The invention, both as to its organization and method of operation, together with further objects and advantages thereof, will best be understood by reference to the following specification taken in connection with the accompanying drawings in which:

FIG. 1 diagrammatically illustrates a combined neutron, gamma ray and collar position logging apparatus characterized by the features of the present invention;

FIGS. 2A and 2B schematically illustrate the subsurface equipment of the apparatus of FIG. 1;

FIGS. 3A, 3B and 3C schematically illustrate the surface equipment of the apparatus of FIG. 1;

FIGS. 4A and 4B schematically illustrate an alternative form of surface equipment which may be employed in the logging system shown in FIG. 1;

FIGS. 5 and 6 are graphs showing certain gamma ray energy distributions which are useful in understanding the present invention;

FIG. 7 is a diagrammatic illustration of an alternative well logging system of the invention;

FIGS. 8A, 8B and 8C are fragmentary diagrammatic illustrations of the subsurface unit of FIG. 8; and FIG. 9 is a schematic diagram of a portion of the surface and subsurface equipment in the system of FIG. 8.

Figure 2B:
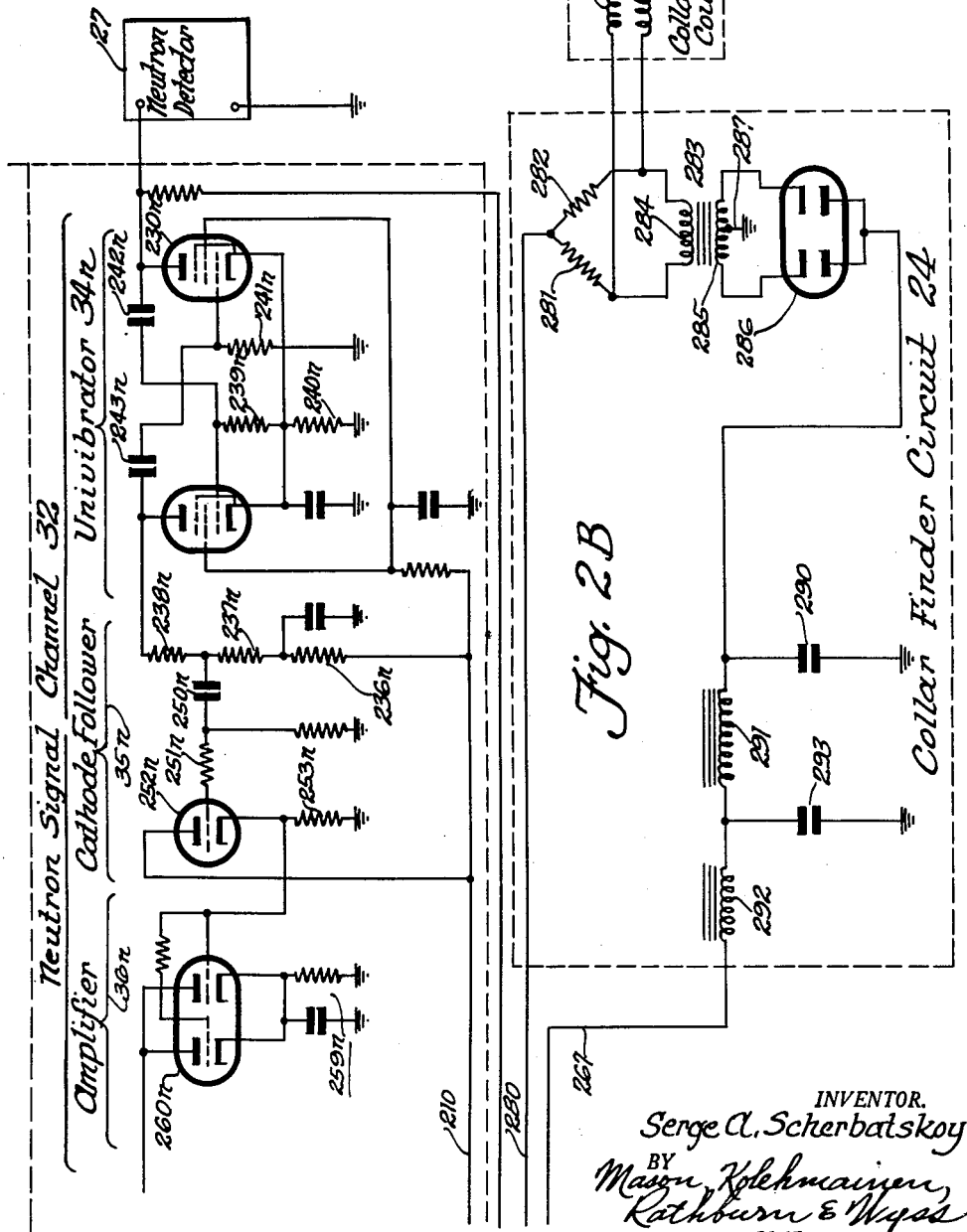

In the description of the invention the terms "neutron log" or "neutron-source log" are used interchangeably and are intended to include any arrangement wherein a log in which rays due to neutron bombardment are recorded. These rays can be either neutrons or gamma rays of capture or any other ray produced by the neutron source.

In general, the subsurface equipment 10 comprises the collar finder coils 23, a collar finder circuit 24, a gamma ray detector 25, power and signal translating circuits 26, a neutron detector 27, a boron shield 28, a paraffin spacer 29 and a mass of lead 30 within which is positioned a suitable neutron source 30a.

The component units 23–30 are all housed within a sealed housing having the requisite physical strength to withstand the fluid pressures encountered and are preferably located in the housing in the particular order illustrated. The unit 10 is arranged to be lowered into the borehole by means of the cable 12 which preferably is of the coaxial type and comprises a center conductor 13 surrounded by and insulated from an armored sheath 14. This sheath is appropriately grounded at the earth's surface and an alternating current generator 17, forming a part of the surface equipment 11 and coupled to the cable conductor 13 through the clocking condenser 18, is utilized to supply power over the cable 12 to the subsurface unit 10. As will be understood by those skilled in the art, the cable 12 extends into the borehole and is carried on a suitable power operated drum 15 located at the earth's surface. Conventional drive facilities may be provided for rotating the drum 15 in either direction whereby the cable 12 may be fed into or reeled out of the borehole so as to move the subsurface equipment 10 longitudinally of the borehole. In the particular arrangement illustrated in FIG. 1, the borehole is lined with the usual ferrous metal casing 16 which is provided with collar coupling elements, not shown, along the length thereof. These elements have the effect of increasing the wall thickness of the casing at evenly spaced points along the length of the casing and hence serve as casing section markers.

Generally considered, the surface equipment 11 comprises a gamma ray pulse detector circuit 19, a neutron pulse detector circuit 20, a collar finder detector circuit 21 and a recorder 22 which is preferably of the commercial type known as the Speed-O-Max, manufactured by the Leeds and Northrop Company of Philadelphia, Pennsylvania. Specifically, the output circuits of the units 19, 20 and 21 are connected to the recording instrument 22 which operates to produce on the record strip 22a a continuous graph of both the neutron and gamma ray signals transmitted to the equipment 11 from the subsurface equipment 10. The recorder 22 also responds to the signals supplied by the detector circuit 21 to produce record indications on the strip 22a identifying the positions of the casing collars so that a correlated neutron, gamma ray and depth measurement log is obtained.

Briefly, to consider the general mode of operation of the simultaneous logging system shown in FIG. 1, without considering in detail the circuit arrangements of the units shown therein in block diagram form, the neutron source 30a, which is preferably a low cost source such as radium beryllium and which is a powerful emitter of neutrons, also emits gamma rays of quite high intensity. The neutrons which are emitted by the source 30a pass through the surrounding formation and are intercepted by the neutron detector 27 and cause ionization thereof. The neutron detector 27 is preferably in the form of a Geiger-Müller counter provided with a foil which becomes radio-active when bombarded by neutrons, and the counter produces pulses, the rate of occurrence of which is proportional to the intensity of the neutrons intercepted by the detector 27.

In order to improve the quality of the neutron log, the paraffin spacer 29 and the boron shield 28 are provided which are positioned between the source 30a and the neutron detector 27. The paraffin, which is a hydrogenous material, acts as a neutron reflector and tends to direct neutrons, which have been slowed down in the environment, laterally into the formation and also slows down any epi-thermal neutrons very strongly so that the epi-thermal neutrons are then capable of absorption by the boron shield 28 which is of high cross section. Furthermore, the boron shield stops the slow neutrons. In this connection, it will be understood that the purpose of the paraffin and boron shield is to prevent the direct transmission of neutrons from the source 30a to the neutron detector 27 so that the neutrons from the source 30a must travel through the surrounding formation and enter the neutron detector 27 in a direction at least partially lateral to the axis of the borehole. The neutron detector pulses produced in the neutron detector 27 are supplied to the power and signal translating circuits 26 wherein these pulses are amplified and are standardized in amplitude and width and are supplied as pulses of a predetermined polarity to the central conductor 13 of the cable 12 for transmission to the surface equipment 11. At the surface, the neutron pulses are separated from the other signals present on the conductor 13, and are supplied to the neutron pulse detector circuit 20 where they are further amplified, standardized in amplitude and width and converted into a signal of varying amplitude which is supplied to the recorder 22.

As generally indicated above, the neutron source 30a also emits a substantial amount of high intensity gamma rays which, if intercepted by the gamma ray detector 24, would cause the gamma ray detector falsely to respond to the artificial gamma rays from the neutron source 30a. In this connection, it will be understood that the shielding effect of the units 28 and 29 is such that gamma rays as well as neutrons from the source 30a do not pass directly to the gamma ray detector 25. In addition, the absorption of the lead shield 30, which surrounds the neutron source 30a, and the mud which surrounds the subsurface unit 10 within the borehole casing, is sufficient to prevent the gamma ray detector from falsely responding to gamma rays produced by the neutron source 30a. However, it will be understood that the gamma ray detector 25 is preferably positioned a substantial distance away from the neutron source 30a. The gamma ray detector 25 is preferably of the Geiger-Muller counter type, and gamma rays which are intercepted by the detector 25 produce pulses in the output circuit thereof, the rate of occurrence of which is proportional to the intensity of the detected gamma rays. The pulses produced in the manner described above in the gamma ray detector 25 are supplied to the power and signal translating circuits 26 wherein the gamma ray detector pulses are amplified and standardized in amplitude and width and are then transmitted as pulses of the opposite polarity over the cable 12 to the surface equipment 11. At the surface, the gamma ray pulses are separated from the other signals present on the cable conductor 13 and are supplied to the gamma ray pulse detector circuit 19 wherein they are further amplified and standardized in amplitude and width and are then supplied to a separate input circuit of the recorder 22.

In the subsurface unit 10, the collar finder apparatus comprises the finder coils 23 and the collar finder circuit 24. The collar finder coils 23 are included in a bridge circuit which is balanced when the coils are located adjacent a ferrous metal casing or pipe of uniform wall thickness. As the coils move past a casing collar, however, one of the coils is influenced by the collar before the other coil, and there is thus produced a momentary unbalance of the impedances of the two coils. As a consequence, a unidirectional voltage deflection, or kick, is produced each time the unit 10 traverses a casing collar and these voltage kicks are supplied over the conductor 13 to the surface equipment 11. The unidirectional collar finder kicks are separated from the other signals present on the cable conductor 13 in the collar finder detector circuit 21 and are supplied to the recorder 22. There is thus produced simultaneously with the gamma ray and neutron logs on the record strip 22a a correlated collar position log so as to provide correlated depth measurement.

*Subsurface Unit 10*

As discussed above in connection with the general system arrangement of FIG. 1, the subsurface unit 10, which is shown in detail in FIGS. 2A and 2B of the drawings, performs the functions of supplying correlated neutron, gamma ray and collar position signals over the conductor 13 to the surface equipment 11 as the subsurface unit 10 is moved longitudinally of the borehole.

Referring now more particularly to FIGS. 2A and 2B, the power and signal translating circuit 26 of the subsurface unit 10 comprises a power supply circuit 33, a gamma ray signal channel 31 and a neutron signal channel 32. The gamma ray signal channel 31 receives pulses from the gamma ray detector 25 in response to gamma rays intercepted by the detector 25. The neutron signal channel 32 is substantially identical to the gamma ray signal channel 31 and receives pulses from the neutron detector 27 in response to neutrons intercepted by the detector 27. The power supply circuit receives alternating current power from the generator 17 over the cable 12 and provides a unidirectional supply voltage which is suitable for energizing the vacuum tubes of the gamma ray signal channel 31 and the neutron signal channel 32. In FIGS. 2A and 2B, corresponding elements in the channels 31 and 32 have been identified with the same reference numerals distinguished by the reference letter "g" for the gamma ray signal channel 31 and the reference letter "n" for the neutron signal channel 32.

Since the gamma ray channel 31 and the neutron signal channel 32 are substantially identical, only a detailed description of the gamma ray signal channel 31 will be included herein. However, it will be understood that the following description applies equally well to the neutron signal channel 32. In general, the gamma ray signal channel 31 comprises a univibrator 34g, a cathode follower 35g and an amplifier 36g. The univibrator 34g performs the functions of quenching the pulses developed by the gamma ray detector 25 and of amplifying the pulses and standardizing the amplitude and width thereof. It is in the form of a so-called one shot multivibrator and comprises two pentode type tubes 230g and 231g. The tube 230g is normally biased beyond anode current cutoff so as to provide a typical "one shot" type of operation wherein the multivibrator is normally quiescent and produces one output pulse for each gamma ray detector pulse supplied thereto. More particularly, the anode of the gamma ray detector 25 and the anode of the tube 230g are connected together and are supplied with anode potential from the power supply circuit 33 through the common load resistor 235g. Anode potential for the tube 231g is supplied by the circuit 33 through the resistors 236g, 237g and 238g. The control grid of the tube 231g is connected to the tube cathode through the resistor 239g and the cathodes of both the tubes 230g and 231g are connected together and through the common resistor 240g to ground. The tube 231g is normally conductive, and the control grid of the tube 230g is connected to ground through the resistor 241g so that with the tube 231g conducting heavily, the cathode of the tube 230g is normally held sufficiently positive with respect to the control grid thereof to maintain the tube 230g nonconductive.

When a gamma ray strikes the detector 25 and causes the detector to discharge and draw anode current through the load resistor 235g, the voltage at the anode of the tube 230g decreases to produce a sharp negative pulse which is applied to the control grid of the tube 231g through the condenser 242g. This pulse serves to cut off current flow through the tube 231g. The resulting decrease in the voltage drop across the resistors 236g, 237g and 238g and rise in positive potential at the anode of the tube 231g causes current flow through the condenser 243g and resistor 241g which serves to decrease the bias on the control grid of the tube 230g so that this tube starts to conduct. Current conduction through the tube 230g serves to maintain the voltage drop across the anode resistor 235g. However, after the charge on the condenser 243g leaks off through the associated circuit components, the tube 231g again starts to conduct to lower the potential at its anode and hence increases the bias on the tube 230g until the latter is again rendered nonconductive. Thus, the univibrator 34g is restored to its normal condition.

As will be apparent from the above explanation, the gamma ray pulses produced at the anode of the gamma ray detector 25 merely serve to trigger the univibrator 34g so that a positive pulse is produced at the anode of the tube 231g each time this tube is rendered non-conductive in response to detection of a gamma ray by the detector 25. These univibrator pulses are of uniform amplitude and width and have a rate of occurrence equal to that of the gamma rays impinging upon the detector 25.

For the purposes of isolation, the positive pulses produced in the anode circuit of the tube 231a in the manner explained above are supplied to the cathode follower 35g. More specifically, the positive univibrator pulses are applied through the condenser 250g and the resistor 251g to the control grid of a cathode follower tube 252g and are repeated across the cathode load resistor 253g of the latter tube. The positive pulses thus produced across the cathode follower output resistor 253g are supplied to the amplifier 36g. This amplifier includes a double triode amplifier tube 260g, the cathodes of the two triode sections being connected through the common self biasing network 259g to ground. Output pulses from the cathode follower 35g are impressed directly upon the control grids of the two sections of the tube 260g and the anodes of the two tube sections are connected together and through the primary winding 261g of an output transformer 262g to the power supply circuit 33. The output transformer 262g is provided with a secondary winding 263g, one terminal of which is connected through the common coupling condenser 266 to ground and the other terminal of which is connected over the conductor 267 to the center conductor 13 of the cable 12. A common transient damping resistor 268 is connected across the secondary winding 263g of the output transformer 262g.

To summarize with respect to the operation of the gamma ray signal channel 31, it will be understood from the foregoing explanation that the pulses produced by the gamma ray detector 25 in response to gamma rays impinging upon this detector are standardized in amplitude and width by means of the univibrator 34g and are further amplified in the amplifier 36g so as to provide across the secondary winding 263g of the coupling transformer 262g sharp pulses of a given polarity, i.e., positive with respect to ground. These pulses are superimposed upon the 400 cycle alternating current of the generator 17 and are transmitted over the cable 12 to the surface equipment 11. In an identical manner, the pulses produced by the neutron detector 22 in response to neutrons impinging upon the detector are standardized in amplitude and width in the univibrator 34n, and are amplified in the amplifier 36n. However, in order to distinguish the gamma ray pulses, which are produced across the output winding 263g and supplied over the conductor 267 to the cable 12 with a given polarity, from the neutron pulses produced across the secondary winding 263n of the neutron channel output transformer 262n, the winding 263n is connected across the common damping network including the resistor 268 and the condenser 266 with the opposite polarity so as to produce neutron pulses having a polarity opposite from the gamma ray pulses on the common conductor 267, i.e., pulses which are negative with respect to ground. The provision of a common line coupling condenser 266 and a common damping resistor 268 for both the gamma ray signal channel 31 and the neutron signal channel 32 serves the important function of substantially preventing ringing in the common output circuit for the channels 31 and 32. In this connection it will be understood that the resistor 268 is of very low value and preferably has a resistance of the order of 27 ohms, in order to prevent the inductive windings 263g and 263n, which are coupled together, from self-oscillating and producing disturbing ringing transients which would interfere with the oppositely polarized gamma ray and neutron pulses supplied to the common conductor 267.

In order to produce correlated indications of the depth to which the subsurface unit 10 is lowered, the collar finder circuit is provided. This circuit is arranged to be energized from the power supply circuit 33 and functions to supply unidirectional voltage deflections, or kicks, over the cable 12 to the collar finder detector circuit 21 at the surface. To supply operating current for the collar finder circuit 24, the ungrounded side of the winding 210 of the power transformer 203 is connected over the conductor 280 to the junction point between two resistors 281 and 282 having equal resistance values. These resistors form two arms of a bridge circuit, the other arms of which comprise identical collar finder coils 23a and 23b. The coils 23a and 23b are connected in series across the resistors 281 and 282 and the junction point between these coils is connected to ground to complete the low voltage alternating current circuit. An output voltage is taken from the above described bridge circuit by means of the coupling transformer 283, the primary winding 284 of which is connected between the opposite diagonal points of the bridge circuit. The outer ends of the transformer secondary winding 285 are connected to a full wave rectifier 286 and the winding 285 is provided with a grounded center tap 287 so as to produce a voltage across the filter condenser 290 which is negative with respect to ground. The rectified potential thus produced across the condenser 290 is smoothed in a filter circuit including the inductance coils 291 and 292 and the shunt condenser 293 so that a substantially unidirectional voltage is supplied over the conductor 267 to the cable conductor 13.

From the foregoing description, it will be evident that the resistors 281 and 282 and the collar finder coils 23a and 23b comprise a bridge circuit and if the impedances of the collar finder coils 23a and 23b are equal, the bridge is balanced and no voltage is produced across the primary winding 284 of the coupling transformer 283. The above-described situation obtains when the coils 23a and 23b are located adjacent a ferrous metal casing or pipe of uniform wall thickness. However, as the coils move past a casing collar, one of the coils 23a or 23b is influenced by the collar before the other coil, and there is thus produced a momentary unbalance of the impedances of the two coils. As a consequence, a voltage is produced across the primary winding 284 which is rectified by the rectifier 286 so as to provide a unidirectional voltage which is supplied over the cable 12 to the surface equipment 11. In this connection, it will be understood that the unidirectional voltage deflections, or kicks, which are produced by the collar finder circuit 24 are isolated from the alternating current power supply circuit by means of the condensers 201 and 18. It will also be understood that the collar finder voltage kicks are superimposed upon the other signals present on the cable conductor 13, so that the overall waveform of the voltage between the inner cable conductor 13 and the grounded outer sheath of the cable comprises a 400 cycle alternating current power wave which is used to energize the power supply circuit 33, gamma ray pulses of positive polarity which are superimposed upon the 400 cycle wave, neutron pulses of negative polarity which are also superimposed upon the 400 cycle wave and finally, the collar finder unidirectional voltage kicks or deflections which comprise a relatively slow increase and decrease of the unidirectional potential on the conductor 13.

Referring now more particularly to the details of the power supply circuit 33, alternating current from the surface generator 17 is transmitted through the condenser 18, the cable conductor 13 and the series connected choke coil 200, and condenser 201 to the primary winding 202 of a power transformer 203, the other end of the winding 202 being connected to ground so as to complete the circuit through the grounded sheath of the cable 12. A part of the alternating current supplied to the circuit 33 is delivered to the series-parallel connected cathode heaters 271 to 278, inclusive, of the various tubes in the subsurface unit 10 through a current limiting resistor 270. The power transformer 203 is provided with a first filament winding 204 which supplies filament power for a high voltage rectifier tube 205. The transformer 203 is also provided with a secondary winding 206, having a center tap 207 which is connected to ground, one side of the winding 206 being connected to the anode of the high voltage rectifier tube 205 and the other end of the winding 206 being connected to the anodes of a duo-diode power rectifier tube 208. The cathodes of the two sections of the tube 208 are connected together and through the filter condenser 209 to ground. The transformer 203 is also provided with a second filament winding 210 which supplies filament power to the vacuum tubes in the signal channels 31 and 32 and also supplies a low voltage alternating current to the collar finder circuit 24. The rectified high voltage output tube 205 is filtered in a two section R-C filter indicated generally at 215 and regulated by means of the series connected gaseous regulator tubes 216 and 217 to provide a rectified and filtered high voltage for exciting the gamma ray detector 25 and the neutron detector 27. Likewise, the rectified and filtered low voltage produced across the condenser 209 is utilized as an anode supply potential for the vacuum tubes of the signal channels 31 and 32.

In order that the power supply circuit 33 may be used as a common power supply for both the neutron and gamma ray signal channels and to prevent harmonics generated by the rectifiers 205 and 208 from being impressed upon the cable 12, the choke coil 200 is connected in series with the condenser 201 between the cable conductor 13 and the primary winding of the power transformer 203. This choke coil effectively prevents harmonics which may be generated by the rectifiers 205 and 208 from being coupled back through the power transformer 203 and impressed upon the cable 12 so that harmonics of the power supply frequency are not intermingled with the signals of the logging system.

A further feature of the power supply circuit 33 resides in the provision of a balanced type of operation whereby the output potential of the supply circuit does not vary appreciably with large changes in ambient temperature. In this connection, it will be understood that the subsurface unit 10 may be lowered into boreholes where the ambient temperature is exceedingly high. It is therefore necessary to provide a very stable power supply circuit which is substantially insensitive to temperature changes for the gamma ray and neutron signal channels so as to prevent interaction between these channels. In order to provide this balanced type of operation, the power transformer 203 is preferably so constructed that the two sections of the winding 206 have an equal number of direct current ampere turns. For example, the portion of the winding 206 which supplies power to the rectifier 208 is wound in phase opposition to the portion of the winding 206 which supplies power to the rectifier 205 and the current values of the two sections of the winding 206 are made inversely proportional to the potentials thereacross. With this arrangement, saturation of the transformer 203 is substantially eliminated and the stability and performance of the power supply 33 at high temperatures is substantially increased.

*Surface Equipment 11*

Referring now more particularly to FIGURES 3A, 3B and 3C, the surface equipment 11 is there illustrated as comprising the gamma-ray pulse detector circuit 19, the neutron pulse detector circuit 20, the collar finder detector circuit 21, the recording instrument 22, an input filter circuit 37, and a power supply circuit 38. The filter circuit 37 is provided for the purpose of separating the gamma-ray pulses from the neutron pulses and supplying the separated pulses to the two detector circuits 19 and 20. The gamma-ray pulse detector circuit 19 is substantially identical with the neutron pulse detector circuit 20 and accordingly corresponding elements of the circuits 19 and 20 have been identified by the same reference numerals, distinguished by the reference letters "g" and "n," respectively. While only the gamma-ray pulse detector circuit 19 is described in detail hereinafter, it will be understood that this description applies equally well to the neutron pulse detector circuit 20.

As indicated above, the three different signals produced in the subsurface unit 10 are supplied over the cable 12 to the filter circuit 37. More specifically, the inner conductor 13 of the cable 12 is connected to a plural section high pass filter comprising the series-connected condensers 301, 302, 303 and 304 and the shunt connected resistors 305, 306, 307 and 308. The filter 37 further comprises an output filter section including the series connected condenser 310 and a shunt connected resistive branch, the value of which may be varied by means of the volume control switch 320. Thus, the movable arm 319 of the switch 320 may be selectively connected to the resistors 311 to 316, inclusive, so as to provide an adjustable time constant for the output section of the filter 37 while maintaining a substantially constant output impedance, as will be well understood by those skilled in the art. The primary winding 329 of a push-pull output transformer 330 is connected between the movable arm of the volume control switch 320 and ground. A pair of series connected resistors 332 and 333 are connected across the secondary winding 331 of the transformer 330, the junction point between the resistors 332 and 333 being connected to ground.

In order to prevent the 400 cycle power wave, which is supplied from the generator 17 over the cable 12 to the subsurface unit 10, from interfering with the detection of gamma-ray and neutron pulses, there is provided a pair of trap circuits which are respectively tuned to the fundamental and third harmonic frequencies of the 400 cycle power wave. More specifically, these trap circuits are connected across the first shunt resistor 305 of the filter circuit 37. The first trap circuit is in the form of a series resonant circuit tuned to 400 cycles and includes a condenser 335 and an inductance 336. Similarly, the second trap circuit is in the form of a series resonant circuit tuned to the third harmonic of the fundamental frequency and comprises the condenser 337 and the inductance 338. The series tuned circuits 335, 336 and 337, 338 present a very low impedance at the fundamental and third harmonic frequencies of the power wave so that these components are not transmitted through the remaining sections of the filter circuit 37.

Considering now the operation of the filter circuit 37 in separating the gamma ray and neutron pulses from the other voltages present on the cable conductor 13, it will be understood that the filter circuit 37 is required to pass the gamma ray and neutron pulses, which are inherently of a transient character and to prevent the transmission of the relatively low frequency 400 cycle power and the substantial unidirectional collar finder voltage kicks. In order to perform these functions, it is necessary that the filter circuit 37 have a good transient characteristic and that the filter circuit not produce "ringing" or self-oscillation after each of the gamma ray and neutron pulses. If the filter 37 were comprised of a plurality of inductance capacitance filter sections, the filter would tend to "ring" and produce parasitic transient oscillations after each pulse, which would make it difficult to distinguish between the oppositely polarized gamma ray and neutron pulses. Accordingly, it is necessary that the filter circuit 37 produce a minimum amount of "ringing" immediately following the gamma ray and neutron pulses. Since the requirement that the filter circuit 37 produce a minimum of transient oscillations is antithetic to the requirement of a sharp cut-off characteristic for the filter, the above-described trap circuits are provided to suppress the predominant components of the power frequency wave supplied by the generator 17.

From the foregoing explanation, it will be seen that the filter circuit 37 supplies gamma ray pulses of one polarity and neutron pulses of the opposite polarity to the series connected resistors 332 and 333. Specifically, the gamma ray pulses are of positive polarity when supplied to the primary winding of the transformer 330. These pulses appear as pulses which are positive with respect to ground across the resistor 332 and as pulses which are negative with respect to ground across the resistor 333. Likewise, the negative neutron pulses appear as pulses which are negative with respect to ground across the resistor 332 and as pulses which are positive with respect to ground across the resistor 333. It is thus evident that the gamma ray pulses may be separated from the neutron pulses by providing gamma ray and neutron circuits which are responsive only to potentials of different predetermined polarities with respect to ground.

The gamma ray pulse detector circuit 19 comprises an amplifier 39g, a univibrator 40g, a cathode follower 41g, a converter 42g and an integrating circuit 43g. The amplifier 39g includes an amplifier tube 340g, the control grid of which is connected to the ungrounded terminal of the resistor 332. The cathode of the tube 340g is operated at a potential which is positive with respect to ground by means of a voltage divider network including the resistor 314g, the potentiometer 342g and the resistor 343g. As will be understood, the potentiometer 342g may be adjusted to vary the cathode potential and hence the bias of the tube 340g. A by-pass condenser 344g is connected from the cathode of the tube 340g to ground. Anode potential is supplied from the +B supply source to the anode of the tube 340g through the resistors 345g and 346g.

It will be evident from the foregoing explanation that the control grid of the tube 340g is connected to ground potential through the resistor 332 whereas the cathode of the tube 340g is operated at a positive potential with respect to ground. The cathode potential may be adjusted by means of the potentiometer 342g so that the tube 340 is normally biased beyond anode current cut-off and the tube 340g will only respond to pulses of positive polarity across the resistor 332. In this connection it will be recalled that the gamma ray pulses appear across the resistor 332 as pulses which are positive with respect to ground. Accordingly, the positive gamma ray pulses are amplified in the tube 340g and appear as negative pulses across the series anode resistors 345g and 346g. It will also be recalled that the neutron pulses appear across the resistor 332 as pulses which are negative with respect to ground. Accordingly, the neutron pulses are not of the proper polarity to cause conduction of the tube 340g and are not passed by this tube.

The negative gamma ray pulses which are produced in the anode circuit of the tube 340g in the manner described above, are supplied through the coupling condenser 350g to the univibrator 40g. The univibrator 40g is essentially a one-shot multivibrator and comprises a pair of triode tubes 351g and 352g the anodes of which are cross-coupled to the control grids thereof through the coupling condensers 353g and 354g. The cathode of the tube 352g is connected directly to ground and the cathode of the tube 351g is biased to a predetermined positive potential through a voltage divider network which includes the resistors 355g and 356g. The control grid of the tube 351g is connected to ground through a resistor 357g so that the tube 351g is normally biased beyond cut-off by the positive bias impressed on the tube cathode from the above-described voltage divider circuit. On the other hand, the tube 352g normally conducts heavily due to the lack of bias between the cathode and control grid thereof. The univibrator 40g operates in exactly the same manner as the univibrator 34g described above. It will be understood, therefore, that each time an amplified gamma ray pulse of negative polarity, and representative of the detected gamma ray, is supplied to the control grid of the tube 352g from the tube 340g, the tube 352g is rendered conductive and the tube 351g is rendered nonconductive for an interval determined by the time constant of the grid circuit. As a consequence, negative pulses of uniform amplitude and width are produced in the anode circuit of the tube 351g at the rate of one such pulse for each pulse delivered to the univibrator 40g from the amplifier tube 340g.

In order to provide a low impedance output circuit for the univibrator 40g and to isolate the univibrator from the converter 42g, the cathode follower 41g is provided.

Specifically, the negative univibrator pulses which are produced across the anode resistor 359g of the tube 351g are applied through the condenser 360g to the control grid of a cathode follower tube 361g and are reproduced with the same polarity across the cathode follower load circuit which comprises the series connected resistor 362g, potentiometer 363g, and resistor 364g. Univibrator pulses of adjustable but uniform amplitude and of negative polarity are thus reproduced at the arm of the potentiometer 363g and are supplied to the converter 42g.

The converter 42g performs the function of providing an output wave the amplitude of which varies in accordance with the rate of occurrence of the pulses developed by the univibrator 40g and hence of the intensity of the gamma rays intercepted by the gamma ray detector 25. To perform this function, the converter 42g utilizes the negative univibrator pulses produced at the arm of the potentiometer 363g to control the charging of a condenser circuit. More specifically, the negative univibrator pulses are supplied through a small condenser 370g to the cathode of a shunt rectifier 371g in the form of a diode which is paralleled by two series connected resistors 372g and 373g, the junction point being connected through the resistor 374g to the power supply circuit 38.

In the converter 42g the condenser 370g is charged through the rectifier 371g during the negative portions of the univibrator pulses supplied from the cathode follower 41g and during these intervals the condenser 370g acquires a charge of the polarity shown in FIG. 3B. During on-pulse periods, the rectifier 371g is conductive and accordingly, the output terminal 375g of the converter 42g is clamped substantially to ground potential for the duration of the pulses from the univibrator 40g through the extremely low impedance of the conductive rectifier 371g. During each off-pulse interval the condenser 370g discharges through the series path including the resistors 372g, 373g, 364g, and the lower portion of the potentiometer 363g so that the voltage at the output terminal 375g decreases exponentially in accordance with the time constant of the condenser 370g and the resistance of its series discharge path. In this connection, it will be understood that during off-pulse intervals the rectifier 371g is non-conductive due to the fact that the cathode potential of this rectifier is raised above ground by virtue of the charge stored in the condenser 370g so that the shunting effect of the rectifier 371g is not present during the off-pulse intervals.

If the univibrator pulses, which coincide in time with the gamma ray detector pulses transmitted from the sub-surface unit 10, are relatively far apart, the condenser 370g will discharge through the associated series path resistance so that the voltage at the output terminal 375g will fall to a minimum value before the next pulse. With this operation the average value of the pulse wave form, produced as described above at the output terminal 375g will have a minimum value. However, if the rate of occurrence of the univibrator pulses increases, the average value of the wave form produced at the output terminal 375g will increase in direct proportion to the frequency of occurrence of these pulses. Accordingly, the inverter circuit 42g provides an output voltage the average value of which is proportional to the rate of occurrence of the univibrator pulses supplied thereto. In this connection, it is noted that the size of the condenser 370g is of considerable importance in that the condenser should not be so large as not to discharge at all during the shortest off-pulse interval. Thus, if the condenser 370g does not discharge appreciably during the shortest off-pulse interval, the voltage thereacross is built up to a relatively high steady state value with the result that the average value of the voltage at the output terminal 375g remains at a maximum positive value and does not vary with the frequency of occurrence of the gamma ray pulses. Accordingly, a given condenser 370g has an upper frequency limit above which the converter 42g will not provide an output voltage the amplitude of which varies in accordance with the frequency of the gamma ray pulses.

In order to increase the frequency range of the converter 42g so that this circuit will respond to gamma ray pulses having widely different rates of occurrence, a second charging condenser 376g is provided which may be substituted for the condenser 370g by means of the selector switch 377g. It will be understood that the condenser 376g has a capacity substantially different from the capacity of the condenser 370g so that the time constant of the series circuit is substantially different when the condensers 370g and 376g are respectively included therein. It will also be understood that the average value of the output wave at the terminal 375g increases in a positive sense as the frequency of occurrence of the univibrator pulses increases due to the fact that the rectifier 371g clamps the negative portions of the univibrator pulses to ground during the conductive periods thereof.

While the output wave from the converter 42g has an average value which varies in accordance with the frequency of occurrence of the univibrator pulses, it also includes the relatively high frequency components of the univibrator pulses themselves, which components are unsuitable for application to the indicating and recording apparatus. Accordingly, an adjustable integrating circuit 43g is provided which integrates the output of the converter 42g so as to provide a substantially unidirectional voltage, the amplitude of which is proportional to the frequency of occurrence of the gamma ray pulses supplied to the surface equipment 11. More specifically, the circuit 43g comprises a first filter section including a series resistor 378g and a shunt condenser 379g and a variable second filter section indicated generally at 380g. The second filter section 380g comprises the series resistors 381g which are of different values and may be selectively combined with the shunt condensers 382g by means of the step selector switch 383g to provide various degrees of smoothing in the second filter section. The movable arm of the selector switch 383g is connected through the limiting resistor 384g to the control grid of a cathode follower type metering tube 385g. The smoothing action of the integrating circuit 43g may be varied by means of the step selector switch 383g so that the output wave from the converter 42g may be filtered to remove the high frequency components thereof without excessively reducing the overall amplitude of this output wave. Thus the step switch 383g may be employed to select the optimum value for the second filter section to provide adequate smoothing out of the high frequency components while reducing the average value of the output wave by a minimum amount.

The metering tube 385g is provided for the purpose of indicating the average value of the output wave from the converter 42g and of providing a low impedance output circuit for the recorder 22. The anode of the metering tube 385g is connected to the power supply circuit 38 and is also connected through a series circuit including the potentiometer 386g and the resistors 387g and 388g to ground. The cathode of the metering tube 385g is connected through the frequency meter 389g to the junction point between the potentiometer 386g and the resistor 387g. With this circuit arrangement, the metering tube 385g acts as an amplifier which provides essentially no voltage amplification but substantial current amplification. Accordingly, the output of the metering tube 385g is of extremely low impedance and is suitable for energizing the frequency meter 389g and for impressing the variable unidirectional voltage derived from the integrating circuit 43g upon the low impedance input circuit of the recorder 22.

The cathode of the metering tube 385g is operated at a potential which is positive with respect to ground by an amount equal to the voltage drop through the series resistors 387g and 388g. The control grid of the tube 385g is conductively connected through the resistors 384g, 381g, 378g and 372g to the junction point between the resistors 373g and 374g. Accordingly, the control grid of the tube 385g is biased positive with respect to ground by an amount equal to the voltage drop across the resistor 373g. The voltage drop across the resistor 373g is preferably relatively small, i.e., in the order of two volts and the potential of the cathode of the metering tube 385g may be varied by adjusting the potentiometer 386g so that the tube 385g draws minimum current in the absence of pulses from the univibrator 40g.

To summarize, it will be apparent that when the univibrator 40g is triggered in accordance with gamma ray pulses transmitted from the subsurface unit 11, the integrating circuit 43g provides an output wave the average value of which is equal to the frequency of occurrence of the univibrator pulses, which wave is supplied to the control grid of the metering tube 385g. If the gamma ray pulses are relatively far apart, a relatively small positive potential is applied to the control grid of the tube 385g and the meter 389g registers a correspondingly small deflection. On the other hand, if the gamma ray pulses are relatively close together, the average value of the frequency meter output wave increases positively, thus causing a corresponding increase in the deflection of the meter 389g. Corresponding variations in the amplitude of the wave trace produced by the recorder 22 are produced in an obvious manner.

As discussed above, the neutron pulses detector circuit 20 is substantially identical to the gamma ray pulse detector circuit 19, and accordingly the detailed description given above applies equally well to the neutron pulse detector circuit 20. However, it will be understood that the amplifier 39n accepts neutron pulses and rejects gamma ray pulses in the same manner as the amplifier 39g accepts gamma ray pulses and rejects neutron pulses. It will be recalled that the output transformer 330 inverts the neutron pulses supplied thereto so that the neutron pulses appear as pulses which are positive with respect to ground across the resistor 333. Also, the transformer 330 inverts the gamma ray pulses so that they appear as pulses which are negative with respect to ground across the resistor 333. The cathode potential of the tube 340n may be adjusted by means of the potentiometer 342n so that the tube 340n is normally operated beyond the anode current cutoff point. Accordingly, the negative gamma ray pulses produced across the resistor 333 are not passed by the tube 340n, but the neutron pulses which appear as positive pulses across the resistor 333 are transmitted through and amplified in the tube 340n.

In other respects the neutron pulse detector circuit 20 is substantially identical with the gamma ray pulse detector circuit 19. However, it should be noted that the neutron pulses may have substantially higher rates of occurrence than the gamma ray pulses. It is thus necessary to provide sufficiently small condensers 370n and 376n in the converter 42n to function satisfactorily at the higher pulse rates. Also, the metering tube 385n is paralleled by a similar tube 390n so that the meter circuit will respond satisfactorily at the higher pulse rates experienced in the neutron channel. It will be understood that the output wave from the neutron pulse detector circuit 20 is produced across the resistor 388n and is supplied to the recorder 22 so as to provide variations in the amplitude of a second wave trace produced by the recorder 22 in an obvious manner.

The power supply circuit 38 is of the conventional full wave rectifier type and is supplied with alternating current from any suitable alternating current source through the on-off power switch 391. The output voltage from the full wave rectifier 392 is filtered in the pi-section filter 393 and supplied through the potentiometer 394 to the series connected gaseous rectifier tubes 395 and 396. There is thus produced on the +B conductor 397 a regulated unidirectional voltage which is suitable for energizing the vacuum tubes of the various components of the surface equipment 11.

The collar position signals supplied by the subsurface equipment 10 to the cable 12 are transmitted over the conductor 13 to the collar finder detector circuit 21. The collar finder detector circuit comprises a plural section low pass inductance-capacitance filter 397 which functions to pass the unidirectional voltage deflections produced by the collar finder circuit 24 when the subsurface unit 10 traverses a collar and rejects the 400 cycle power wave and the high frequency gamma ray and neutron pulses. The output signal delivered by the low pass filter circuit 397 is connected to a collar finder meter 398 which is connected in series with the resistor 399 across the output condenser of the filter 397. The meter 398 produces a visual indication of the casing collars traversed by the collar finder coils 23a and 23b of the subsurface unit 10. The unidirectional voltage deflections produced across the resistor 399 are supplied to a separate input circuit of the recorder 22 so as to produce correlated collar position information simultaneously with the production of correlated gamma ray and neutron logs.

Figure 4B:
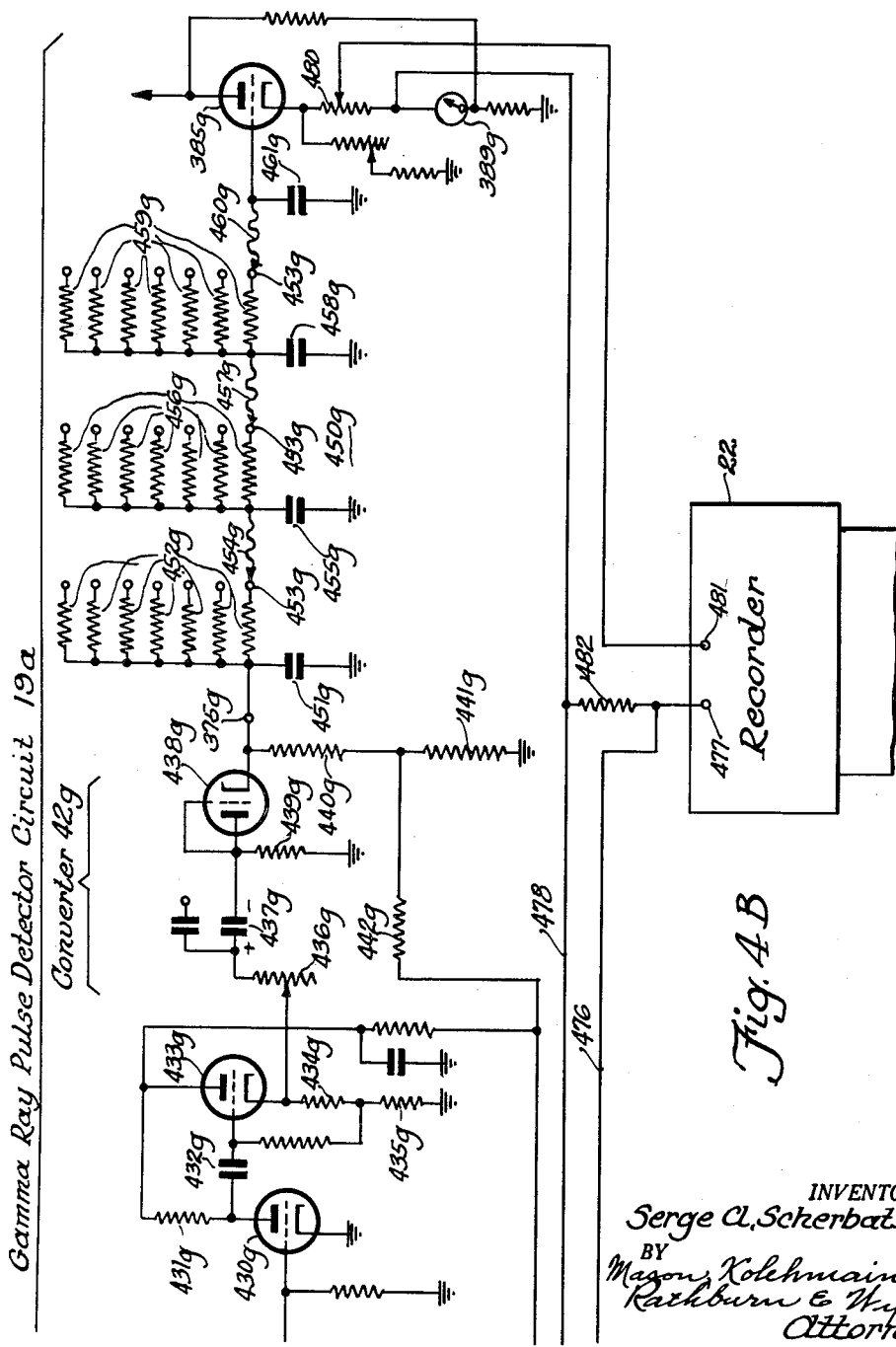

Referring now more particularly to FIGS. 4A and 4B of the drawings, an alternative embodiment of the surface equipment is there illustrated which is particularly adapted for use in the simultaneous well logging system of FIG. 1. In FIGS. 4A and 4B only a single detector channel is shown, namely, the gamma ray pulse detector circuit 19, and the common filter circuit 37 is omitted. However, it will be understood that an identical neutron pulse detecting circuit 20 may be employed in the manner described in detail in connection with FIGS. 3A, 3B and 3C to provide the simultaneous logs described above. In the alternative embodiment of the surface equipment shown in FIGS. 4A and 4B, elements which are the same as corresponding elements in FIGS. 3A, 3B and 3C have been given the same reference numerals.

In the arrangement illustrated in FIGS. 4A and 4B, the gamma ray pulses which are passed by the transformer 330 are repeated as positive pulses across the resistor 332 and supplied through the condenser 400g to the control grid of the first amplifier tube 401g. The cathode of the tube 401g is connected through the resistors 402g and 403g to ground. Gamma ray pulses which are impressed upon the control grid of the tube 401g are amplified by this tube and appear as negative pulses across the anode load resistor 404g. The negative pulses produced at the anode of the tube 401g are directly connected over the conductor 405g to the control grid of a cathode follower tube 406g and are reproduced with the same polarity across the cathode resistor 407g thereof.

In order to stabilize the amplitude of the gamma ray pulses and to the end that interaction between the gamma ray and neutron channels is substantially prevented, an automatic gain control circuit is provided which includes the cathode follower tube 410g, the rectifier tube 411g and the shunt control tube 412g. The control grid of the cathode follower tube is directly connected to the conductor 405g so that the negative gamma ray pulses produced in the anode circuit of the tube 401g are supplied to the control grid of the cathode follower tube 410g and are reproduced with the same polarity across the cathode resistor 415g thereof. The negative pulses as reproduced across the cathode resistor 415g are applied through the condenser 416g to the cathode of the rectifier tube 411g. The cathode of the tube 411g is also connected to ground through the resistors 417g and 418g, and the junction point between the resistors 417g and 418g is connected through the resistor 419g to the +B conductor. The anode of the rectifier tube 411g is connected to ground through a rectifier load resistor 420g which is paralleled by a filter condenser 421g so that there is produced across the rectifier load circuit 420g and 421g a unidirectional voltage which is negative with respect to ground and has an amplitude proportional to the amplitude of the gamma ray pulses.

The negative control voltage thus produced across the rectifier load resistor 420g is supplied to the control grid of the shunt control tube 412g. This tube is provided with an anode which is connected to the cathode of the tube 401g and the cathode of the tube 412g is connected through the potentiometer 422g to ground. Thus, the tube 412g is effectively connected across the cathode resistors 402g and 403g of the tube 401g so that the anode-cathode space path resistance of the control tube 412g produces a variable shunting effect on the resistors 402g and 403g. A switch 423g is also provided which is controlled by movement of the control arm of the potentiometer 422g and is opened so as to introduce the tube 412g when the potentiometer is in its minimum resistance position.

Considering now the operation of the above-described automatic gain control circuit in maintaining the amplitude of the gamma ray pulses substantially constant, it will be apparent from the foregoing explanation that the gamma ray pulses produced across the resistor 332 are amplified and inverted in the tube 401g and are repeated as negative pulses across the cathode resistor 415g of the cathode follower tube 410g. These negative pulses are peak rectified in the rectifier circuit including the rectifier tube 411g and the load circuit 420g and 421g so as to provide a unidirectional control voltage which is negative with respect to ground. The negative control voltage is applied to the control grid of the control tube 412g so as to vary conduction therethrough and hence the anode-cathode space path resistance thereof. As the amplitude of the gamma ray pulses increases the negative control voltage increases correspondingly and operates to reduce current conduction through the tube 412g so that the shunting effect of the tube 412g is decreased. When the shunting effect of the tube 412g is decreased, the effective resistance of the cathode circuit of the tube 401g is increased, and, due to the fact that this circuit is degenerative, a negative feed back action takes place which reduces the amplification in the tube 401g so that the amplitude of the gamma ray pulses is decreased. The automatic gain control circuit thus operates to control the amplitude of the gamma ray pulses inversely with changes in the signal level of these pulses.

The standardized gamma ray pulses which are produced in the manner described above across the resistor 407g are supplied to the univibrator 40g which latter unit functions in a manner entirely identical with that described in connection with FIGS. 3A, 3B and 3C to provide univibrator pulses of uniform amplitude and width coincident with each of the gamma ray pulses. The univibrator pulses are applied through the condenser 360g to the control grid of a second amplifier tube 430g. This tube is provided for the purpose of amplifying the univibrator pulses before they are supplied to the converter 42g. The negative univibrator pulses are amplified and inverted in the tube 430g and appear as positive pulses across the second load resistor 431g thereof. The amplified univibrator pulses thus produced at the anode of the tube 430g are applied through condenser 432g to the control grid of a cathode follower tube 433g and are reproduced with the same polarity across the series connected cathode resistors 434g and 435g.

Due to the fact that the univibrator pulses are inverted in polarity in the tube 434g, that is, the univibrator pulses appear as positive pulses across the cathode resistors 434g and 435g, it is necessary to reverse the polarity of the converter 42g. Thus, the positive univibrator pulses produced in the cathode circuit of the tube 434g are coupled through the potentiometer 436g and the charging condenser 437g to the anode of the shunt rectifier 438g. A resistor 439g is connected from the anode of the tube 438g to ground and the cathode of the tube 438g is connected through the resistors 440g and 441g to ground, the junction point between the resistors 440g and 441g being connected through the resistor 442g to the +B conductor. The charging condenser 437g is charged through the rectifier 438g, which conducts during the on-pulse intervals of the positive univibrator pulses so that the condenser 437g is charged through the rectifier 438g and acquires a charge of the polarity shown in FIG. 4B. During off-pulse intervals the condenser 437g discharges through the series path which includes the resistors 439g, 435g, 434g and the potentiometer 436g, and there is produced at the output terminal 375g an output wave the average value of which is proportional to the frequency of occurrence of the univibrator pulses.

In order to provide a smoothing circuit for the output wave of the converter 42g, whereby maximum output is derived for a given gamma ray detector response, a multi-mesh resistance-capacitance low pass filter indicated generally at 450g is provided. More specifically, the output wave from the converter 42g is applied to the first filter section which includes the shunt condenser 451g and one of the series connected resistors 452g. The desired filter resistor may be selected by means of one movable contact on a step selector switch 453g. The output wave is then applied through the series resistor 454g to the second section which includes the shunt condenser 455g and one of the resistors 456g which may be selected by a second movable contact on the step selector switch 453g. The output wave is then applied through the series resistor 457g to a third filter section which includes a shunt connected condenser 458g and one of the series resistors 459g which may be selected by a third movable contact on the step switch 453g. The output wave then passes through the series resistor 460g to the control grid of the metering tube 385g, there being a fourth shunt condenser 461g connected between the control grid of the tube 385g to ground.

Considering now the operation of the multi-mesh low pass filter 452, it will be seen from the foregoing explanation that the output wave from the converter 42g must be smoothed out to provide a control voltage having an amplitude the average value of which varies in accordance with the rate of occurrence of the gamma ray pulses. However, it is necessary to reduce the extraneous noise voltages which may be present in the output wave of the converter 42g in order to maximize the response and provide a usable control voltage for the metering tube 385g. With the multi-mesh low pass filter 450g the effect of statistical fluctuations appears to be substantially reduced for an output wave of a given amplitude, so that the sensitivity and output of the converter 42g is effectively increased. Accordingly, it is preferable to employ the multi-mesh R-C filter circuit, described above, instead of a conventional time constant circuit for the reason that a greater percentage of the signal is available as a usable output wave.

In order to vary the sensitivity of the recorder 22 and to provide maximum output for the recorder from the metering tube 385g, the compensation circuit 470 is provided. This circuit comprises a rectifier network 470a which is operated from a suitable alternating current supply and providing a regulated negative voltage of the polarity shown across the series connected resistors 471 and 472. A potentiometer 473 is connected across the series resistors 471 and 472 and the arm of the potentiometer 473 is connected through the resistor 474 to the movable contact of a selector switch 475. The junction point between the resistors 471 and 472 is connected over the conductor 476 to one input terminal 477 of the recorder 22. The fixed contact of the selector switch 475 is connected over the conductor 478 to one side of the meter 389g and to the bottom end of a potentiometer 480 which is connected between the cathode of the tube 385g and the meter 389g. The arm of the potentiometer 480 is connected to the other terminal 481 of the recorder 22. A resistor 482 is connected between the conductors 476 and 478. It will be understood that the terminals 477 and 481 comprise one input circuit of the recorder 22 and that another identical input circuit is employed for the neutron pulse detector circuit.

Considering now the operation of the compensation circuit 470, it will be understood that the voltage across the resistor 482 may be varied from a relatively large negative voltage to a positive voltage by varying the position of the arm of the potentiometer 473. Preferably the resistor 471 has a value approximately ten times the value of the resistor 472, and when the arm of the potentiometer is in its uppermost position, a relatively large negative voltage is produced across the resistor 482. It will be recalled that the metering tube draws more current as the pulse rate increases so that the voltage across the potentiometer 480 increases positively as the pulse rate increases. It is thus seen that the voltage across the resistor 482, when the arm of the potentiometer 473 is in its uppermost position, is in opposition to the voltage across the potentiometer 480 and operates to reduce the net voltage applied to the terminals of the recorder 477 and 481. If the arm of the potentiometer 473 is moved downwardly, the negative voltage across the resistor 482 decreases so as to increase the net voltage supplied to the recorder 22. If the arm of the potentiometer 473 is in its lowest position, a positive voltage of smaller magnitude is produced across the resistor 482 which is added to the output voltage across the potentiometer 480. In this connection it will be understood that the voltage between the conductor 476 and the arm of the potentiometer 473 is reduced in the ratio of the resistors 474 and 482 so that a relatively small voltage is inserted in series with the recorder input terminals. The value of the resistor 474 may be different from the gamma ray and neutron detector circuits. The arm of the potentiometer 480 may be adjusted to impress a portion of the output voltage produced across the potentiometer 480 on the recorder and thereby vary the sensitivity of the recorder 22. The selector switch 475 may be mechanically connected to the arm of the potentiometer 473 so that when this potentiometer is in its extreme position the switch 475 is opened, and the resistor 482 then becomes merely a voltage dividing resistor and reduces the voltage applied to the input terminals of the recorder from the potentiometer 480.

In natural gamma ray well logging a preponderance of the gamma rays is generated by radium which is dispersed in the rocks in very small quantities. In FIG. 5 the energy in m.e.v. of the received gamma rays is plotted as the abscissa and the intensity or rate of occurrence of these gamma rays is plotted as the ordinate. Referring to this figure, the curve 500 illustrates the energy spectrum characteristic of pure radium wherein the gamma rays are emitted by a radium point source in air relatively close to the detector so that there is no scattering or degradation of energy. However, when the radium is dispersed in large masses of rocks the energy spectrum is considerably altered by so-called Compton scattering, which is also referred to as the "build-up factor," and the high energy gamma rays tend to generate low energy gamma rays so that the spectral composition of the original source is very much altered and appears generally like the curve 501 in FIG. 5. From the curve 501 it is evident that the rays have become concentrated in the lower energy region, the rays normally appearing in the lower energy region being augmented by degraded higher energy gamma rays, it being understood that low energy gamma rays which originate a substantial distance from the detector cannot penetrate sufficiently to reach the detector. Accordingly, if a natural gamma ray log is made of the formations by accepting the entire energy spectrum the log will represent predominantly the intense gamma rays corresponding to the energy range "a" shown in FIG. 5 most of which come from a region relatively close to the subsurface unit. On the other hand, if a selective natural gamma ray log is made of only the gamma rays in the energy range "b" shown in FIG. 5 this log will substantially exclude the degraded and soft gamma rays coming from a vicinity close to the subsurface unit and will tend to emphasize the more penetrating gamma rays which originate a greater distance behind the wall of the borehole and are thus less affected by the drilling mud, casing, cement, mud cake, filtrate and other factors which tend to be relatively constant and which obscure the desired variations in gamma ray intensity which represent changes in the formations themselves. With such a selective natural gamma ray log there is more contrast between a high radioactivity reading and a low radioactivity reading because the relatively constant effect of the drilling mud, casing, etc., is minimized.

When a radium-beryllium source of neutrons is employed and a log of gamma rays of capture resulting from neutron bombardment by the source is made, the energy spectrum of the gamma rays received by the detector associated with the neutron source includes a number of component factors. In FIG. 6 of the drawings wherein in m.e.v. is plotted as the abscissa and intensity of the measured gamma rays is plotted as the ordinate, the curve 505 illustrates the portion of the energy spectrum due to the radium of the radium-beryllium source and which is not related to neutron bombardment of the formations. However, when the effect of the beryllium is added to the characteristic 505 the characteristic 506 is obtained, the difference between the characteristics 505 and 506 indicating the portion of the measured gamma rays which is due to neutron bombardment. In FIG. 6 the characteristics 505 and 506 are representative of the energy spectrum of measured gamma rays when the subsurface unit is in a zone of low porosity limestone the pore spaces of which are filled with fresh water. The characteristic 507 in FIG. 6 is similar to the total characteristic 506 but is representative of the energy spectrum obtained when the subsurface unit is in a zone of higher porosity limestone and the pore spaces are filled with fresh water. The characteristic 508 is similar to the characteristic 507, i.e., high porosity limestone, but illustrates the energy spectrum when the pore spaces of the limestone are filled with salt water.

In a neutron log it is desirable to have the log represent primarily porosity variations in the formations and to be substantially unaffected by other factors such as the salt content of the drilling mud or of the connate water. Accordingly, the differences between the characteristics 507 and 508 due to salt content of the drilling mud and connate water are undesirable and a true porosity log would preferably exclude the gamma rays in the energy range "c" of FIG. 6. Furthermore, the large background of gamma rays which do not vary with lithology, such as the gamma rays within the indicated energy range "e" of FIG. 6, should preferably be excluded since these gamma rays do not represent the desired variations in porosity of the formation. However, the gamma rays in the energy range "d" of FIG. 6 will provide maximum information concerning porosity variations since this energy range represents the portion of the total spectrum due to neutron bombardment of the formation by the radium-beryllium source. In this connection, it will be noted that the characteristic 505 in FIG. 6 differs from the characteristic 501 of FIG. 5. This is because it has been assumed in the characteristic 505 of FIG. 6 that all direct rays from the radium-beryllium source are prevented from reaching the detector whereas in the characteristic 501 some of the gamma rays naturally emanating from the formations will strike the natural gamma ray detector directly without any interactions with the rock or loss of energy thereby.

When a natural gamma ray log is taken simultaneously with a log involving a radium-beryllium neutron source the further problem arises of preventing the gamma rays emitted by the radium-beryllium source from affecting the natural gamma ray log. The energy spectrum of the gamma rays emitted by the radium of the radium-beryllium source would theoretically be identical to the characteristic 500 of FIG. 5. However, if we assume all of the direct rays from the source are blocked all of the rays from the radium-beryllium source which reach the natural gamma ray detector first travel outwardly from the source and are scattered by the mud and the formations and migrate back and forth upwardly through the mud annulus which surrounds the subsurface unit to the natural gamma ray detector. Accordingly, the energy spectrum of the gamma rays actually received by the natural gamma ray detector is substantially as shown by the characteristic 511 in FIG. 5, it being understood that all of the gamma rays which reach the natural gamma ray detector are either entirely degraded or scattered gamma rays. It will also be noted that the degradation evidenced in the characteristic 511 is substantially greater than the degradation shown in the characteristic 501 due to modification of the theoretical characteristic 500 by the formations in the case of natural radioactivity. By selectively measuring only those gamma rays which occur in the energy range "b" of FIG. 5 the natural gamma ray detector may be made substantially independent of gamma rays emitted by the radium-beryllium source even though the natural gamma ray detector is positioned relatively close to the radium-beryllium source.

In FIG. 7 of the drawings there is shown in diagrammatic form an alternative embodiment of the invention wherein the above described selective natural gamma ray log and selective neutron source log may be obtained. Referring to this figure, a subsurface unit 600 is supported by means of a single conductor cable 601 and comprises a sealed steel housing within which there is positioned a pair of collar finder coils 602, a collar finder circuit 603, a first radiation detector 604, power and signal translating circuits 605, a second radiation detector 606, a boron shield 607, a plastic shield 608, and a radium-beryllium source 609 which is enclosed within a body of high density material 610 such as sintered tungsten, copper and nickel, known as Hevimet. The units 600 to 603, inclusive certain portions of the unit 605, and the units 607 to 610, inclusive, may be substantially identical to the corresponding portions of the system of FIG. 1 described in detail heretofore, it being understood that the Hevimet source holder 610 replaces the lead holder 30 of FIG. 1 and the plastic shield 608 replaces the paraffin spacer 29 in the system of FIG. 1.

The first radiation detector 604 is employed as a natural gamma ray detector and may comprise any suitable detector arrangement capable of producing pulses having an amplitude proportional to the energy of gamma rays intercepted by the detector. Preferably, the detector 604 comprises a scintillation counter arrangement which functions to develop the required pulses in a manner to be described in more detail hereinafter. The second radiation detector 606 may be employed to detect either slow neutrons resulting from neutron bombardment of the formations by the source 609 or, in the alternative, the detector 606 may be arranged to detect gamma rays of capture resulting from such neutron bombardment. However, in either case the detector 606 comprises a suitable arrangement for developing pulses the amplitude of which is proportional to the energy of the incoming particles and the rate of occurrence of which is proportional to the intensity thereof. Preferably, the detector 606 also comprises a scintillation counter arrangement which functions to produce the required pulses in a manner to be described in more detail hereinafter. The signal translating portions of the circuit 605 include facilities for selecting pulses representing a predetermined selected energy range from the output of each of the detectors 604 and 606 in a manner to be described in more detail hereinafter.

At the surface, the center conductor 620 of the cable 601 is connected to a 700 cycle oscillator 621, a 900 cycle oscillator 622, a first pulse detector circuit 623, a second pulse detector circuit 624 and a collar finder detector circuit 625, the outputs of the units 623, 624 and 625 being supplied to a recorder 626. A source of alternating current power 17 is also coupled through the condenser 18 to the center conductor of the cable 601. The units 623 to 626 may be substantially identical to the corresponding units of the system of FIG. 1 described in detail heretofore. The oscillators 621 and 622 are employed to control the subsurface signal translating circuits 605 so as to vary the energy ranges selected from the outputs of the detectors 604 and 606, as will be described in more detail hereinafter.

The subsurface unit 600 is preferably constructed so that it has an outer diameter of approximately three and five-eighths inches so that the subsurface unit 600 may be employed in borehole casings of relatively small diameters. However, when the unit 600 has a relatively small outer diameter and is used in boreholes of relatively large diameter an annulus of drilling mud of substantial thickness is provided between the unit 600 and the casing through which radiations from the source 609 may migrate upwardly and cause false responses in the detectors 604 and 606. In order to prevent such false responses an aluminum sleeve 630 of substantial thickness may be employed when the unit 600 is used to log boreholes of relatively large diameter, the sleeve 630 being secured to the bottom end of the unit 600 by means of the bolt 631. The sleeve 630 is preferably of sufficient diameter substantially to center the unit 600 within the casing so as to minimize variations in the response of the detectors due to eccentricities of the casing within the borehole. The sleeve 630 is of sufficient thickness substantially to displace the drilling mud between the subsurface unit 600 and the bore hole casing and since the sleeve 630 is of aluminum or other suitable low density material it provides less attenuation than the drilling mud for neutrons and gamma rays which travel outwardly into the formations or inwardly to the detector 606. However, in order to prevent the upward migration of undesired radiations from the source 609 through the sleeve 630 the sleeve 630 is provided with an annular inwardly opening recess 632 within which is positioned an annular shield 633 of hydrogenous material and an annular shield 634 of boron-rich material. More particularly, the shield 633 comprises a plurality of arcuate segments of nylon which may be inserted in the recess 632 and held in place by means of a suitable spring clamp (not shown) and the shield 634 also comprises a plurality of arcuate segments of a boron-rich material prepared by powered metallurgy and sintering, these arcuate segments being held in place by means of a suitable retaining ring or clamp so as to provide a unitary sleeve arrangement. Preferably, the shields 607 and 608 within the unit 600 are of materials similar to the shields 634 and 633 provided in the sleeve 630.

It has been found that if the shields 607 and 608 within the unit 600 and the shields 633 and 634 in the sleeve 630 are not employed, some of the neutrons from the source 609 will travel upwardly through the interior of the subsurface unit 600 or through the sleeve 630 along the paths 636 shown in FIG. 8B. The neutrons travelling the paths 636 then migrate outwardly into the formations in the immediate vicinity of the detector 606 and follow the paths 637 back to the detector 606 in the case of slow neutron measurement, or gamma rays of capture are produced in the formations and these gamma rays of capture follow the paths 637 to the detector 606. In either event it will be evident that increasing the spacing between the source 609 and the detector 606 will not provide any substantial improvement insofar as neutrons which travel the paths 636 are concerned. When the shields 607 and 608 are provided within the unit 600 and the shields 633 and 634 are provided in the sleeve 630 neutrons from the source 609 are prevented from travelling upwardly through the detector and sleeve as shown in FIG. 8B and instead travel outwardly from the source 609 along the paths 640 (FIG. 8A) at relatively small angles to the horizontal. This is because the shields 607, 608 and 633, 634 are substantially neutron opaque, the shields 608 and 633 tending to slow down the fast neutrons from the source 609 and cause them to become thermalized and the boron in the shields 607 and 634 serving to capture and stop these thermal neutrons. Accordingly, when the shields 633 and 634 are employed, neutrons from the source 609 are prevented from migrating upwardly at an angle smaller than the angle alpha shown in FIG. 7. It will also be noted that the angle alpha can be controlled by controlling the position of the shields 633 and 634, it being obvious that if these shields are level with the neutron source 609 the angle alpha will be 180 degrees.

While the shields 633 and 634 function to attenuate upwardly migrating neutrons in the manner described above, it will be noted that these shields do not extend around the detector 606 but instead the full thickness of the aluminum sleeve 630 is employed to displace the drilling mud in the vicinity of the detector 606 so that radiations resulting from neutron bombardment are not attenuated by the drilling mud in logging relatively large diameter boreholes.

In order to prevent the natural gamma ray detector 604 from responding to gamma rays emitted by the source 609, the sleeve 630 is provided with another recess 645 within which is positioned an annular Hevimet shield 646, the shield 646 being positioned around the detector 604. The shield 646 is provided with a plurality of radial holes 647 which are filled with a low density material such as magnesium. As more clearly shown in FIG. 8C of the drawings, the shield 646 functions to make the detector 604 directional so that this detector responds only to gamma rays emanating from positions subtended by the angle beta shown in FIG. 8C. If desired, a single annular gap in the shield 646, which is filled with magnesium, may be employed instead of the multiplicity of magnesium-filled holes 647. Since gamma rays from the source 609 must travel substantially vertically to reach the detector 604 it will be evident that additional shielding against these gamma rays is provided by the shield 646 while permitting the detector 604 to respond to gamma rays naturally emanating from the formations which enter within the angle beta shown in FIG. 8C.

If the sleeve 630 becomes stuck in the borehole during the logging operation, facilities are provided for detaching the sleeve 630 from the subsurface unit 600 so that this unit may be recovered without damage thereto. More particularly, the retaining bolt 631 is provided with a weakened section 630 of relatively small diameter so that the bolt 631 will break if the sleeve 630 becomes jammed in the borehole and additional upward force is exerted on the cable 601 so that the unit 600 is freed from the unit 630 and may be withdrawn from the borehole. Since all of the materials in the sleeve 630 can be broken up by drilling the borehole may be cleared of this material after withdrawal of the unit 600.

In order to select the desired energy ranges described above in connection with FIGS. 5 and 6, the signal translating circuit associated with each of the detectors 604 and 606 is provided with a pulse selector circuit 900, one of the circuits 900 being shown in detail in FIG. 9 of the drawings in conjunction with the detector 604 and certain other portions of the power and signal translating circuits 605 and a portion of the surface equipment of the system of FIG. 7. Referring to FIG. 9, the detector 604 which, in the embodiment shown in FIG. 7, is used as a natural gamma ray detector, includes a scintillation crystal 901, one side of which is positioned adjacent the end of a photomultiplier tube 902, the space between the end of the tube 902 and the crystal 901 being filled by a layer 903 of silicone to provide a suitable optical coupling between the crystal 901 and the tube 902. A layer 904 of magnesium oxide is provided around the other sides of the crystal 901 to provide a light reflecting shield therefor. The photomultiplier tube 902 is surrounded by a mu-metal shield 905 and is energized from the power supply circuit 33 through a voltage divider 907, it being understood that the power supply circuit 33 shown in block diagram form in FIG. 7 is substantially identical to the correspondingly identified circuit shown and described in detail above in connection with FIG. 2A of the drawings, the circuit 33 having a high voltage terminal which is connected by way of the conductor 908 to the voltage divider 907.

In order to compensate for variations in ambient temperature as the detector 604 is lowered into the borehole, the crystal 901, photomultiplier tube 902 and voltage divider 907 are enclosed in a vacuum flask (Dewar jar) 911, illustrated diagrammatically in FIG. 9, which is provided with a stopper 912 through which the high voltage conductor 908 and the output conductor 909 of the photomultiplier extend. A suitable ice container 913 is provided within the flask 911 which may be filled while the unit is at the surface so as to maintain the temperature within the flask 911 substantially constant during the logging operation. Preferably, the scintillation crystal 901 comprises a crystal of thallium activated sodium iodide and the photomultiplier 902 functions to develop negative pulses on the output conductor 909 thereof which are proportional in amplitude to the energy of gamma rays intercepted by the crystal 901, it being understood that the intensity of the measured gamma rays is a function of the rate of occurrence of the developed pulses.

The pulses developed on the conductor 909 are coupled through the condenser 915 to the first control grid of the amplifier tube 916 in the preamplifier 910 and are repeated in amplified form and with positive polarity across the anode resistor 917 of the tube 916.

The pulse selector circuit 900 comprises a first univibrator 920, otherwise referred to as a common cathode multivibrator, and a second univibrator 921. The univibrator 920 comprises the triode tubes 922 and 923 and the univibrator 921 comprises the triode tubes 924 and 925. In the univibrator 920, the anode of the tube 922 is coupled through the condenser 926 to the control grid of the tube 923 and the cathodes of the two tubes 922 and 923 are connected through the variable resistance potentiometer 927 to ground, i.e., the housing of the subsurface unit 600. The anode of the tube 923 is connected to one end of a center tapped primary winding 930 of a coupling transformer 931, the other end of the winding 930 being connected to the anode of the tube 925 in the univibrator 921. The B+ terminal of the power supply circuit 33 is connected to the center tap of the winding 930 and is also coupled through the filter network 935 and through the anode resistor 936 to the anode of the tube 922 and through the filter network 937 and the anode resistor 938 to the anode of the tube 924. In the univibrator 921 a coupling condenser 940 couples the anode of the tube 924 to the control grid of the tube 925 and a common cathode potentiometer 941 is connected between the cathodes of the tubes 924, 925 and ground.

The positive detector pulses produced at the anode of the preamplifier tube 916 are coupled through the condenser 945 to the control grid of the tube 922 and the control grid of the tube 924 in parallel, these control grids being connected through a common grid resistor 946 and a rectifier load resistor 947 to ground a filter condenser 948 being connected across the resistor 947 for reasons to be described hereinafter. One side of the secondary winding 950 of the transformer 931 is connected to ground and the other side of this winding is coupled through the condenser 951 to the anode of the univibrator tube 230g in the univibrator 34g shown and described in detail heretofore in connection with FIG. 2A of the drawings, the remaining components of the univibrator 34g being identical to those shown in FIG. 2A and being identified in FIG. 9 by the same reference numerals.

The 700 cycle signal developed on the center conductor 620 of the cable 601 by the oscillator 621 at the earth's surface, is coupled through the condenser 955 to the input of a 700 cycle bandpass filter 956, the output of the filter 956 being connected to the cathode of a rectifier 957 the anode of which is connected to the junction point of the resistors 946 and 947. All of the equipment described thus far in connection with FIG. 9 is disposed within the subsurface unit 600, it being understood that the output of the univibrator 34g is supplied to a cathode follower similar to the cathode follower 35g of FIG. 2A and through an amplifier similar to the amplifier 36g of FIG. 2A and the output of this amplifier is supplied to the conductor 267 which is in turn connected to the conductor 620 of the cable 601 so as to transmit pulses of one polarity over the cable 601 to the earth's surface in the manner described in detail above in connection with the above mentioned portions of FIG. 2A.

At the earth's surface the output of the oscillator 621 is supplied to a potentiometer 960, the arm of the potentiometer 960 being connected through the resistor 961 and the condenser 962 to the center conductor 620 of the cable 601. In a similar manner the output of the oscillator 622 is supplied to a potentiometer 963 the arm of which is connected through the isolating resistor 964 to the condenser 962 so that signals from both the oscillator 621 and 622 are coupled through the condenser 961 to the conductor 620 of the cable 601 and are transmitted over this cable to the subsurface unit 600.

Considering now the operation of the above described portion of the subsurface unit 600 shown in FIG. 9, the scintillation crystal 901 and photomultiplier 902 function to develop negative pulses on the conductor 909 which have an amplitude proportional to the energy of the corresponding gamma rays intercepted by the crystal 901, these pulses having pulse heights corresponding to the energy spectrum characteristic 501 described heretofore in connection with FIG. 5. The detector pulses appearing upon the conductor 909 are linearly amplified in the tube 916 so as to preserve the relative amplitudes of these pulses, and the amplified pulses which are of positive polarity are coupled through the condenser 945 to the control grids of the tubes 922 and 924. In the univibrator 920 the tube 923 is normally conducting and produces a flow of current through the cathode resistor 927 which biases the tube 922 beyond cutoff by an amount proportional to the voltage developed across the common cathode resistor 927. In a similar manner, in the univibrator 921 the tube 925 is normally conducting and biases the tube 924 beyond cutoff by an amount proportional to the voltage developed across the common cathode resistor 941. The cathode bias voltage impressed upon the tube 922 may be varied by varying the potentiometer 927 and the cathode bias impressed upon the tube 924 may be varied by an adjustment of the potentiometer 941.

Assuming first that the pulses impressed upon the control grids of the tubes 922 and 924 are of sufficient amplitude to render both of these tubes conductive, when the tube 922 is rendered conductive the anode current thereof flows through the anode resistor 936 so as to produce a voltage drop at the anode of the tube 922 which is coupled through the condenser 926 to the control grid of the tube 923 and a regenerative action is initiated such that the tube 923 is very quickly driven beyond cutoff while the tube 922 is rendered fully conductive. The tube 923 is held beyond cutoff for the time interval required for the condenser 926 to discharge through the grid resistors 970 and 971 of the tube 923 and when the condenser 926 has discharged sufficiently to bring the control grid of the tube 923 above cutoff the tube 923 again conducts and through the common cathode resistor 927 again renders the tube 922 non-conductive. During the period when the tube 923 is non-conductive a positive pulse is produced across the portion 972 of the winding 930 due to the flow of anode current through the tube 923, the wave shape of this positive pulse being independent of the triggering pulse impressed upon the control grid of the tube 922 and being determined primarily by the time constant 926, 970 and 971.

Since it has been assumed that the same pulse which renders the tube 922 conductive also renders the tube 924 conductive in the univibrator 921, the univibrator 921 also functions to produce a positive pulse across the other half 973 of the winding 930 during the period when the univibrator tube 935 of the univibrator 921 is rendered non-conductive. The widths of the positive pulses developed across the opposed sections 972 and 973 of the winding 930 may be adjusted by variation of the resistors 971 and 974 so that these positive pulses coincide and cancel each other so that no output pulse is produced across the secondary winding 950 of the transformer 931. Accordingly, and pulse which is of sufficient amplitude to trigger both of the univibrators 920 and 921 is not selected in the pulse selector circuit 900 since the univibrator output pulses produced across the opposed sections of the winding 930 completely cancel each other. In this connection, it will be understood that the outputs of two differently biased triodes could be compared instead of employing the univibrators 920 and 921. However, it has been found that when the output pulses from differently biased triodes are compared the pulses do not completely cancel but instead sharp voltage spikes remain which would be falsely interpreted as pulses in the selected energy range rather than pulses outside this energy range. By comparing the outputs of the univibrators 920 and 921, which consist of pulses of uniform amplitude and width substantially completely cancellation can be obtained.

If the pulse impressed upon the grids of the tubes 922 and 924 is of relatively small amplitude such that neither one of these tubes is rendered conductive, neither of the univibrators 920 and 921 will be triggered and again no output pulse will be developed across the winding 950. If, however, the univibrator tubes 922 and 924 are given different cathode biases, then the tube with the smallest cathode bias may be triggered by a pulse which is of insufficient amplitude to overcome the larger cathode bias of the other tube. For example, if the cathode bias on the tube 922 is adjusted to 20 volts positive and the cathode bias on the tube 924 is adjusted to 15 volts positive, a pulse of 15 volts amplitude impressed upon the control grids of both the tubes 922 and 924 will cause the tube 924 to be triggered but will not render the tube 922 conductive. Accordingly, under these conditions the univibrator 921 would be triggered, a pulse would be produced across the section 973 of the winding 930 and a corresponding output pulse would be developed across the output winding 950. The cathode bias voltages on the tubes 922 and 924 may be adjusted by means of the cathode potentiometers 927 and 941 so that pulses will be produced across the output winding 950 in response to a range of pulse amplitudes corresponding to the energy range "b" of FIG. 5 and all pulses of amplitudes above and below this energy range will be rejected in the circuit 900.

The output winding 950 is so connected that the pulses developed thereacross when the univibrator 921 is triggered are of negative amplitude and these pulses are coupled through the condenser 951 to the univibrator 34g wherein further standardization in amplitude and width of the pulses is achieved. If desired, the univibrator 34g may be omitted and the output pulses developed across the winding 950 coupled directly to the cathode follower 35, it being understood that pulses corresponding to the pulses provided across the winding 950 are coupled through the amplifier 36g and are impressed upon the conductor 620 of the cable 601 by way of the conductor 267.

In order to control the position of the selected energy range within the overall energy spectrum of the detector, the 700 cycle signal impressed upon the conductor 620 of the cable 601 from the oscillator 621 at the earth's surface is separated from the other signals on the conductor 620 in the bandpass filter 956, is rectified in the rectifier 957 and a unidirectional control potential is developed across the resistor 947 proportional to the amplitude of the 700 cycle signal on the conductor 620 of the cable 601. The control potential developed across the resistor 947 is connected through the common grid resistor 946 to the control grids of both of the tubes 922 and 924 and hence this control potential affects both of these tubes equally. Accordingly, the potentiometer 960 at the earth's surface may be adjusted to provide the necessary control potential across the resistor 947 in the subsurface unit 600 so that the desired energy range "b" may be selected from the overall energy spectrum of gamma rays received by the scintillation crystal 901. In this connection it will be understood that the width of the energy range "b" is determined by the relative cathode bias voltages impressed upon the tubes 922 and 924 and this width can be varied by adjustment of the common cathode potentiometers 927 and 941. If it is desired to adjust the width of the energy range rather than the position of this energy range within the overall energy spectrum, the control potential developed by rectifying the 700 cycle signal may be impressed upon only one of the univibrators 920 or 922, as, for example, by connecting this control potential in the cathode circuit of one of these univibrators so that the width of the energy range "b" can be varied by adjustment of the potentiometer 960 at the earth's surface.

When making so-called "neutron source" type logs, i.e. logs in which radiations due to an especially introduced radiation source are recorded, we can consider, for example, five different types:

(1) Neutron-gamma ray of capture log. In this log, the intensity of the gamma rays of capture resulting from neutron bombardment by a neutron source is recorded.

(2) Neutron-slow neutron log. In this log, the intensity of the slow neutrons due to a neutron source is recorded.

(3) Neutron-fast neutron log. In this log, the intensity of the fast neutrons due to a neutron source is recorded.

(4) Gamma-gamma log. In this log, the intensity of the scattered gamma rays due to an artificially introduced gamma ray source is recorded.

(5) Gamma-photoneutron log. In this log, the intensity of neutrons due to an artificially introduced gamma ray source is recorded.

A suitable neutron source is radium-beryllium and a suitable gamma ray source is radium or an artificial radioelement that emits very energetic gamma rays. The detectors for the logging methods 1 to 5 would be of three types: (a) gamma ray detectors employing thallium activated sodium iodide scintillating material; (b) slow neutron detectors employing europium activated lithium iodide scintillating material; (c) fast neutron detectors employing zinc sulphide and Lucite molded scintillating material. The detector circuit, preamplifier, and pulse selector circuit in all cases would be substantially identical to the circuit illustrated in FIG. 9.

In the subsurface unit 600, the radiation detector 606 is substantially identical to the radiation detector 604 described in detail above in connection with FIG. 9 if a neutron-gamma ray of capture log is to be made, i.e. the scintillation material is thallium-activated sodium iodide, and its preamplifier and pulse selector circuits are substantially identical to preamplifier 910 and pulse selector circuit 900 of FIG. 9. If a neutron-slow neutron log is desired, the scintillation crystal in the detector 606 is preferably a crystal of europium activated lithium iodide. If a neutron-fast neutron log is desired, the scintillation material is preferably a zinc sulphide and Lucite molded cylinder (as described by W. F. Hornyak in Review of Scientific Instruments, June 1952, vol. 23, No. 6, pp. 264–267). If a gamma-gamma log is desired, the scintillation material is preferably thallium activated sodium iodide and the radium-beryllium neutron source is replaced by a gamma ray source of radiocobalt 60. The output of the detector 606 is amplified in an amplifier similar to the preamplifier 910 and in the case of a neutron-gamma ray of capture log a predetermined range of pulse heights corresponding to the energy range "d" in FIG. 6 is selected by means of a pulse selector circuit corresponding to the circuit 900. In order to vary the selected energy range "d" the 900 cycle signal impressed upon the conductor 620 from the oscillator 622 is separated from the other signals on the conductor 620 in a 900 cycle band pass filter the output of which is rectified to provide a control potential for the univibrators of the pulse selector circuit associated with the detector 606 in a manner similar to that described above in connection with the 700 cycle filter 956. Accordingly, the potentiometer 963 may be adjusted to obtain the desired position of the energy range "d" in the overall spectrum of the output of the detector 606. The output of the pulse selector circuit associated with the detector 606 is coupled to the input of the univibrator 34n shown in FIG. 2B, or, if further standardization of pulse amplitude and width is not required, to the cathode follower 35n, it being understood that the output pulses from this pulse selector circuit are coupled through the amplifier 36n to the conductor 620 of the cable 601. In this connection it will be understood that the pulses selected from the output of the detector 604 are impressed upon the conductor 620 in one polarity and the pulses selected from the output are impressed upon the conductor 620 in the opposite polarity, these oppositely polarized pulses being transmitted over the cable 601 and through the filter 37 to the respective pulse detector circuits 623 and 624, which latter circuits may be identical to the circuits 19 and 20 described in detail above in connection with FIGS. 3A, 3B, 3C, 4A and 4B of the drawings, so that corresponding output voltages proportional to the rate of occurrence of the respective pulses are supplied to the recorder 626, a collar finder signal also being supplied to this recorder from the collar finder detector circuit 625 in a manner identical to that described in detail above in connection with the system of FIG. 1.

As described generally heretofore, the pulse selector circuit associated with the detector 606 is adjusted to select only those pulses corresponding to the energy range "d" shown in FIG. 6 when a neutron-gamma ray of capture log is made so that this log will respond primarily to porosity variations and will be substantially unaffected by such effects as the salt content of the drilling mud or the connate water and the large background of gamma rays due to the radium of the radium-beryllium source 609. It will also be noted that by selecting only those pulses corresponding to the energy rate "d" the detector 606 is rendered completely non-responsive to natural gamma rays all of which have energies below approximately 2.2 m.e.v. but very little, if any of the gamma rays of capture will be eliminated since all of these gamma rays of capture have energies of 2.2 m.e.v. or above. Accordingly, the energy range "d" is particularly desirable since it permits a large source-detector spacing while maintaining the detector 606 substantially unresponsive to natural gamma rays. In this connection it will be understood that the energy range "d" may be extended to include the energy range "c" if the effects of salt content of the drilling mud or the connate water do not influence the log too greatly.

The pulse selector circuit 900 associated with the detector 604 may also be adjusted to select only those pulses corresponding to gamma rays in the energy range "b," as described generally heretofore, so that degraded and scattered gamma rays from the source 609, which are primarily outside of the energy range "b" as shown by the characteristic 511 in FIG. 5, will cause a relatively small response in the detector 604 even though a very close spacing of the detectors 604 and 606 is employed. When only natural gamma rays in the energy range "b" are measured the natural gamma ray detector may be positioned approximately twenty inches from the detector 606, and these detectors may be positioned with the scintillation crystals thereof at the opposite ends of a common evacuated flask so that a single cooling system may be used for both detectors with the result that the complexity and size of the subsurface unit are substantially reduced.

Should it be desired to produce neutron-slow neutron logs or neutron-fast neutron logs or gamma-gamma logs, appropriate scintillation materials as described hereinabove and appropriate adjustments of the pulse height selector must be made. For example, to record a neutron-fast neutron log, a zinc sulphide and Lucite scintillating material is used and the pulse height selector is adjusted by the controls provided at the surface so that the characteristic pulses representing fast neutrons are passed and the pulses representing gamma rays are suppressed. Thus, in order to record fast neutrons only, the pulse selector must be adjusted so as to pass only pulses representing certain energy ranges as described by W. F. Hornyak in Review of Scientific Instruments, June 1952, vol. 23, No. 6, pp. 264–267.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

What is claimed as new and desired to be secured by Letters Patent of the United States is:

1. In a radiation well logging system, a subsurface unit, a cable for lowering said unit into a borehole, a source of radiations in said unit for bombarding the formations traversed by said unit, first detector means included in said unit for detecting within said unit first radiations incoming thereto due to bombardment of the formations by said source, means for deriving a first electrical signal representing said first detected radiations, second detector means included in said unit for detecting gamma rays naturally emanating from the formations, said second detector means producing pulses proportional in amplitude to the energy of substantially all gamma rays intercepted thereby, means for developing a second electrical signal corresponding only to those pulses representing natural gamma rays in a predetermined energy range, means for transmitting both said first and second electrical signals over said cable to the earth's surface, and means for recording at the earth's surface said first and second electrical signals to provide continuous logs of said detected first radiations and natural gamma rays in said selected energy range.

2. In a radiation well logging system, a subsurface unit, a cable for lowering said unit into a borehole, a source of radiations in said unit for bombarding the formations traversed by said unit, first detector means included in said unit for detecting within said unit first radiations incoming thereto due to bombardment of the formations by said source, means for deriving a first electrical signal representing said first detected radiations, second detector means included in said unit for detecting gamma rays naturally emanating from the formations and developing pulses having amplitudes proportional to the energy of the corresponding natural gamma rays, means for selecting from said developed pulses only those pulses corresponding to natural gamma rays within a selected energy range, means for transmitting both said first electrical signal and said selected pulses over said cable to the earth's surface, and means for recording at the earth's surface said first electrical signal and said selected pulses to provide continuous logs of said detected first radiations and natural gamma rays in said selected energy range.

3. In a radiation well logging system, a subsurface unit, a cable for lowering said unit into a borehole, a source of radiations in said unit for bombarding the formations traversed by said unit, said radiation source emitting gamma rays within a first energy range, first detector means included in said unit for detecting within said unit first radiations incoming thereto due to bombardment of the formations by said source, means for deriving a first electrical signal representing said first detected radiations, second detector means included in said unit for detecting gamma rays naturally emanating from the formations and developing pulses having amplitudes proportional to the energy of the corresponding gamma rays, means for selecting from said developed pulses only those pulses corresponding to natural gamma rays within a selected energy range which is different from said first energy range, means for transmitting both said first electrical signal and said selected pulses over said cable to the earth's surface, and means for recording at the earth's surface said first electrical signal and said selected pulses to provide continuous logs of said detected first radiations and natural gamma rays in said selected energy range.

4. In a radiation well logging system, a subsurface unit, a cable for lowering said unit into a borehole, a source of neutrons in said unit for bombarding the formations traversed by said unit, first detector means included in said unit for detecting gamma rays of capture incoming thereto due to bombardment of the formations by said source, means for deriving a first electrical signal representing only a selected energy range of said detected gamma rays of capture, second detector means included in said unit for detecting gamma rays naturally emanating from the formations, said second detector means producing pulses proportional in amplitude to the energy of substantially all gamma rays intercepted thereby, means for developing a second electrical signal corresponding only to those pulses representing natural gamma rays in a predetermined energy range, means for transmitting both said first and second electrical signals over said cable to the earth's surface, and means for recording at the earth's surface said first and second electrical signals to provide continuous logs of gamma rays of capture and natural gamma rays in said selected energy ranges.

5. In a radiation well logging system, a subsurface unit, a cable for lowering said unit into a borehole, a source of neutrons in said unit for bombarding the formations traversed by said unit, first detector means included in said unit for detecting gamma rays of capture incoming thereto due to bombardment of the formations by said source, means for deriving a first electrical signal representing only a selected energy range of said detected gamma rays of capture, which energy range is outside the energy range of gamma rays naturally emanating from the formations, second detector means included in said unit for detecting gamma rays naturally emanating from the formations, said second detector means producing pulses proportional in amplitude to the energy of substantially all gamma rays intercepted thereby, means for developing a second electrical signal corresponding only to those pulses representing natural gamma rays in a predetermined energy range, means for transmitting both said first and second electrical signals over said cable to the earth's surface, and means for recording at the earth's surface said first and second electrical signals to provide continuous logs of gamma rays of capture and natural gamma rays in said selected energy ranges.

6. In a radiation well logging system, a subsurface unit, a cable for lowering said unit into a borehole, a source of neutrons in said unit for bombarding the formations traversed by said unit, detector means included in said unit for detecting gamma rays of capture incoming thereto due to bombardment of the formations by said source, said detector means also detecting gamma rays naturally emanating from the formations and producing pulses proportional in amplitude to both said gamma rays of capture and said natural gamma rays, means for deriving an electrical signal representing only a selected energy range of said detected gamma rays of capture which is between predetermined upper and lower limits and is above the energy range of said detected natural gamma rays, means for transmitting said electrical signal over said cable to the earth's surface, and means for recording said electrical signal to provide a continuous log of gamma rays of capture in said selected energy range.

7. In a radiation well logging system, a subsurface unit, a cable for lowering said unit into a borehole, a source of neutrons in said unit for bombarding the formations traversed by said unit, detector means included in said unit for detecting gamma rays of capture incoming thereto due to bombardment of the formations by said source, said detector means also detecting gamma rays naturally emanating from the formations, means for deriving an electrical signal representing only a selected energy range of said detected gamma rays of capture which is between predetermined upper and lower limits and is above the energy range of said detected natural gamma rays, means for transmitting said electrical signal over said cable to the earth's surface, means for recording said electrical signal to provide a continuous log of gamma rays of capture in said selected energy range, and means for varying said selected energy range of gamma rays of capture.

8. In a radiation well logging system, a subsurface unit, a cable for lowering said unit into a borehole, a source of neutrons in said unit for bombarding the formations traversed by said unit, detector means included in said unit for detecting gamma rays of capture incoming thereto due to bombardment of the formations by said source and developing pulses having amplitudes proportional to the energy of the corresponding gamma rays of capture, pulse selector means in said subsurface unit for selecting from said developed pulses only those pulses corresponding to gamma rays of capture within a selected energy range which is between predetermined upper and lower limits, means for transmitting said selected pulses over said cable to the earth's surface, means for deriving an output signal proportional to the rate of occurrence of said selected pulses, means for recording said output signal to provide a continuous log of gamma rays of capture in said selected energy range, and means for controlling said pulse selector means over said cable to vary said selected energy range of gamma rays of capture.

9. In a radiation well logging system, a subsurface unit, a cable for lowering said unit into a borehole, detector means included in said unit for detecting radiations incoming thereto and developing pulses having amplitudes proportional to the energy of the corresponding incoming radiations, first wave shaping means in said subsurface unit for developing first signal pulses of uniform amplitude and duration in response to those ones of said developed pulses which exceed a first predetermined amplitude, second wave shaping means in said subsurface unit for developing second signal pulses of uniform amplitude and duration in response to those ones of said developed pulses which exceed a second predetermined amplitude, means in said subsurface unit for comparing said first and second pulses to develop output pulses only when said first and second signal pulses do not coincide, said first and second predetermined amplitudes being so chosen that said output pulses represent incoming radiations within a selected energy range, means for transmitting said output pulses over said cable to the earth's surface, means at the earth's surface for deriving an output signal proportional to the rate of occurrence of said output pulses, and means for recording said output signal to provide a continuous log of incoming radiations in said selected energy range.

10. In a radiation well logging system, a subsurface unit, a cable for lowering said unit into a borehole, detector means included in said unit for detecting radiations incoming thereto and developing pulses having amplitudes proportional to the energy of the corresponding incoming radiations, first wave shaping means in said subsurface unit for developing first signal pulses of uniform amplitude and duration in response to those ones of said developed pulses which exceed a first predetermined amplitude, second wave shaping means in said subsurface unit for developing second signal pulses of uniform amplitude and duration in response to those ones of said developed pulses which exceed a second predetermined amplitude, means in said subsurface unit for comparing said first and second pulses to develop output pulses only when said first and second signal pulses do not coincide, said first and second predetermined amplitudes being so chosen that said output pulses represent incoming radiations within a selected energy range, means for transmitting said output pulses over said cable to the earth's surface, means at the earth's surface for deriving an output signal proportional to the rate of occurrence of said output pulses, means for recording said output signal to provide a continuous log of incoming radiations in said selected energy range, and means for varying at least one of said predetermined amplitudes, thereby to vary said selected energy range.

11. In a radiation well logging system, a subsurface unit, a cable for lowering said unit into a borehole, detector means included in said unit for detecting radiations incoming thereto and developing pulses having amplitudes proportional to the energy of the corresponding incoming radiations, first wave shaping means in said subsurface unit for developing first signal pulses of uniform amplitude and duration in response to those ones of said developed pulses which exceed a first predetermined amplitude, second wave shaping means in said subsurface unit for developing second signal pulses of uniform amplitude and duration in response to those ones of said developed pulses which exceed a second predetermined amplitude, means in said subsurface unit for comparing said first and second pulses to develop output pulses only when said first and second signal pulses do not coincide, said first and second predetermined amplitudes being so chosen that said output pulses represent incoming radiations within a selected energy range, means for transmitting said output pulses over said cable to the earth's surface, means at the earth's surface for deriving an output signal proportional to the rate of occurrence of said output pulses, means for recording said output signal to provide a continuous log of incoming radiations in said selected energy range, and means controllable over said cable from the earth's surface for simultaneously varying said predetermined amplitudes, thereby to vary said selected energy range.

12. In a radiation well logging system, a subsurface unit, a cable for lowering said unit into a borehole, a source of fast neutrons in said unit for bombarding the formations traversed by said unit, detector means included in said unit and spaced from said source for detecting within said unit radiations incoming thereto due to bombardment of the formations by said source, a first shield of hydrogenous material positioned within said unit between said source and said detector for slowing down fast neutrons emitted by said source substantially to the thermal level, a second shield of boron-rich material positioned within said unit between said first shield and said detector for capturing the thermal neutrons from said first shield, means for deriving an electrical signal from said detector and trnasmitting the same over said cable to the earth's surface, means for recording said electrical signal to provide a continuous log of incoming radiations, means including an external aluminum shield adapted to fit over one end of said subsurface unit and enclose said source and said detector for displacing the drilling mud in logging boreholes of relatively large diameter as compared to the diameter of said subsurface unit, and means for detachably securing said aluminum shield to said subsurface unit so that said unit may be readily separated from said aluminum shield in the event said aluminum shield becomes stuck in the borehole.

13. In a radiation well logging system, a subsurface unit, a cable for lowering said unit into a borehole, a source of fast neutrons in said unit for bombarding the formations traversed by said unit, detector means included in said unit and spaced from said source for detecting within said unit radiations incoming thereto due to bombardment of the formations by said source, a first shield of hydrogenous material positioned within said unit between said source and said detector for slowing down fast neutrons emitted by said source substantially to the thermal level, a second shield of boron-rich material positioned within said unit between said first shield and said detector for capturing the thermal neutrons from said first shield, means for deriving an electrical signal from said detector and transmitting the same over said cable to the earth's surface, and means for recording said electrical signal to provide a continuous log of incoming radiations, means including an external aluminum sleeve adapted to fit over one end of said subsurface unit and enclose said source and said detector for displacing the drilling mud in logging boreholes of relatively large diameter as compared to the diameter of said subsurface unit, said sleeve having a first insert of hydrogenous material positioned between said source and said detector when said sleeve is positioned over said unit for slowing down fast neutrons which would normally be transmitted through said sleeve, and a second insert of boron-rich material positioned between said first insert and said detector when said sleeve is positioned over said unit for capturing thermal neutrons from said first insert.

14. In a radiation well logging system, a subsurface unit, a single conductor cable for lowering said unit into a borehole, a source of neutrons in said unit for bombarding the formations traversed by said unit, first scintillation counter means included in said unit for detecting gamma rays of capture due to bombardment of the formations by said source and developing pulses having amplitudes proportional to the energy of the corresponding gamma rays of capture, first pulse selector means included in said unit for selecting from said developed gamma ray of capture pulses only those pulses corresponding to gamma rays of capture within a first selected energy range, second scintillation counter means included in said unit for detecting gamma rays naturally emanating from the formations and developing pulses having amplitudes proportional to the energy of the corresponding natural gamma rays, second pulse selector means included in said unit for selecting from said developed natural gamma ray pulses only those pulses corresponding to natural gamma rays within a selected energy range, means for transmitting both said selected gamma ray of capture pulses and said selected natural gamma ray pulses over the single conductor of said cable to the earth's surface, means responsive to said selected pulses for producing continuous logs of gamma rays of capture and natural gamma rays within said selected energy ranges, a source of oscillations at the earth's surface, means for transmitting a signal from said oscillation source over the single conductor of said cable to said subsurface unit, means in said unit for rectifying said oscillation signal to provide a control potential, and means responsive to said control potential for controlling the energy range of one of said pulse selector means.

References Cited in the file of this patent

UNITED STATES PATENTS

| | | |
|---|---|---|
| 2,382,279 | Wolf | Aug. 14, 1945 |
| 2,390,433 | Fearon | Dec. 4, 1945 |
| 2,481,014 | Herzog | Sept. 6, 1949 |
| 2,483,139 | Herzog | Sept. 27, 1949 |
| 2,487,058 | Krasnow et al. | Nov. 8, 1949 |
| 2,508,772 | Pontecorvo | May 23, 1950 |
| 2,509,908 | Crumrine | May 30, 1950 |
| 2,670,442 | Herzog | Feb. 23, 1954 |
| 2,686,268 | Martin et al. | Aug. 10, 1954 |
| 2,721,944 | Ruble | Oct. 25, 1955 |
| 2,724,779 | McKay | Nov. 22, 1955 |
| 2,745,970 | Dewan | May 15, 1956 |
| 2,752,508 | Zito | June 26, 1956 |
| 2,763,788 | Herzog | Sept. 18, 1956 |
| 2,785,314 | Grahame | Mar. 12, 1957 |